US012809499B2

(12) United States Patent
Unno

(10) Patent No.: US 12,809,499 B2
(45) Date of Patent: Nov. 24, 2026

(54) INFORMATION PROCESSING DEVICE, METHOD, AND RECORDING MEDIUM FOR GENERATING FIRST OBJECT INCLUDING FIRST INFORMATION AND NOT INCLUDING SECOND INFORMATION, SECOND OBJECT INCLUDING SECOND INFORMATION, AND INFORMATION INDICATING CORRESPONDENCE RELATIONSHIP

(71) Applicant: CASIO COMPUTER CO., LTD., Tokyo (JP)

(72) Inventor: Shunsuke Unno, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 206 days.

(21) Appl. No.: 18/588,128

(22) Filed: Feb. 27, 2024

(65) Prior Publication Data

US 2024/0288999 A1 Aug. 29, 2024

(30) Foreign Application Priority Data

Feb. 27, 2023 (JP) ................................ 2023-027966

(51) Int. Cl.

| | |
|---|---|
| ***G06F 3/0484*** | (2022.01) |
| ***G06F 3/04817*** | (2022.01) |
| ***G06F 3/0482*** | (2013.01) |
| ***G09B 7/02*** | (2006.01) |

(52) U.S. Cl.
CPC ........ *G06F 3/0484* (2013.01); *G06F 3/04817* (2013.01); *G06F 3/0482* (2013.01); *G09B 7/02* (2013.01)

(58) Field of Classification Search
CPC .............................. G06F 3/04817; G09B 7/02
See application file for complete search history.

(56) References Cited

U.S. PATENT DOCUMENTS

| | | | | |
|---|---|---|---|---|
| 10,712,909 B2 * | 7/2020 | Lee | G06F 3/04886 |
| 2012/0214147 A1 | 8/2012 | Ernst et al. | |
| 2017/0102833 A1 * | 4/2017 | Kodali | G06F 9/45504 |
| 2022/0108276 A1 * | 4/2022 | Stringham | G06Q 10/103 |
| 2022/0284825 A1 * | 9/2022 | Inoue | G06F 3/0486 |

(Continued)

FOREIGN PATENT DOCUMENTS

| | | |
|---|---|---|
| EP | 3379519 A1 | 9/2018 |
| JP | 2015176079 A | 10/2015 |

(Continued)

OTHER PUBLICATIONS

Extended European Search Report dated Jun. 24, 2024 for European Application Patent No. 24157727.

*Primary Examiner* — Andrea C Leggett
(74) *Attorney, Agent, or Firm* — Scully, Scott, Murphy & Presser, P.C.

(57) ABSTRACT

An information processing device executes processing of detecting that second information for first information acquired from a database is input by a user operation, and generating, in response to detecting an instruction to generate an object for the second information, a first object including the first information, a second object including the second information, and information indicating that the first object and the second object are in a correspondence relationship.

20 Claims, 25 Drawing Sheets

(56) References Cited

U.S. PATENT DOCUMENTS

| | | | | |
|---|---|---|---|---|
| 2024/0364645 | A1* | 10/2024 | Zumbrunnen ...... | G06F 3/04845 |
| 2025/0271856 | A1* | 8/2025 | Von Volkmann ..... | G06F 3/0485 |

FOREIGN PATENT DOCUMENTS

| | | | |
|---|---|---|---|
| JP | 2017156548 | A | 9/2017 |
| JP | 2002132131 | A | 5/2022 |
| JP | 2022148106 | A | 10/2022 |

* cited by examiner

FIG. 3

12d

USER ID

NB1 NB2 NB3 ...

| STICKY NOTE ID | | NB1−1 | NB1−2 | NB1−3 |
| --- | --- | --- | --- | --- |
| TYPE | | TEXT | TEXT | DICTIONARY |
| ATTRIBUTE | | · CREATION/EDITING DATE AND TIME<br>· DATA SETTING INFORMATION<br>· SUB-ATTRIBUTE/... | · CREATION/EDITING DATE AND TIME<br>· DATA SETTING INFORMATION<br>· SUB-ATTRIBUTE/... | · CREATION/EDITING DATE AND TIME<br>· DATA SETTING INFORMATION<br>· SUB-ATTRIBUTE/... |
| COORDINATES (x, y) | | (50, 100) | (300, 200) | (50, 450) |
| SIZE (w, h) | | (200, 200) | (200, 200) | (200, 200) |
| CONNECTION OPEN/CLOSE FLAG (OPEN: 1/CLOSE: 0) | | 1 | 1 | − |
| CONNECTION STICKY NOTE ID | CONNECTION DESTINATION | NB1−2 | − | − |
| | CONNECTION SOURCE | − | NB1−1 | − |

...

FIG. 20

12d

USER ID

ET1 ET2 ET3 ...

| STICKY NOTE ID | EQ1 | EA1 | EA2 |
|---|---|---|---|
| TYPE | TEXT | VOICE | TEXT |
| ATTRIBUTE | · CREATION/EDITING DATE AND TIME<br>· DATA SETTING INFORMATION (TEST QUESTION/ UNEDITABLE)<br>· SUB-ATTRIBUTE/... | · CREATION/EDITING DATE AND TIME<br>· DATA SETTING INFORMATION (ANSWER/EDITABLE)<br>· SUB-ATTRIBUTE/... | · CREATION/EDITING DATE AND TIME<br>· DATA SETTING INFORMATION (ANSWER/EDITABLE)<br>· SUB-ATTRIBUTE/... |
| COORDINATES (x, y) | (50, 100) | (300, 200) | (50, 450) |
| SIZE (w, h) | (200, 200) | (200, 200) | (200, 200) |
| CONNECTION OPEN/CLOSE FLAG (OPEN: 1/CLOSE: 0) | 1 | 1 | – |
| CONNECTION STICKY NOTE ID: CONNECTION DESTINATION | EA1 | EA2 | – |
| CONNECTION STICKY NOTE ID: CONNECTION SOURCE | – | EQ1 | EA1 |

...

INFORMATION PROCESSING DEVICE, METHOD, AND RECORDING MEDIUM FOR GENERATING FIRST OBJECT INCLUDING FIRST INFORMATION AND NOT INCLUDING SECOND INFORMATION, SECOND OBJECT INCLUDING SECOND INFORMATION, AND INFORMATION INDICATING CORRESPONDENCE RELATIONSHIP

CROSS-REFERENCE TO RELATED APPLICATION

This application claims priority to Japanese Patent Application No. JP 2023-027966, filed on Feb. 27, 2023. The entire disclosure of Japanese Patent Application No. JP 2023-027966 is incorporated by reference herein.

BACKGROUND

Technical Field

The disclosure of the present specification relates to an information processing device, an information processing method, and a recording medium.

Related Art

As a test question provision system using a network, JP 2017-156548 A is known. JP 2017-156548 A describes a learning support server that supports learning of a learner using a communication line. The learning support server transfers a written answer by the learner, which is written in an answer sheet, to a terminal device of a scoring person. When receiving a scoring result of the written answer by the scoring person from the terminal device, the learning support server analyzes a learning situation of the learner on the basis of the scoring result.

SUMMARY

An information processing device according to one embodiment of the present disclosure includes a control unit configured to execute processing of detecting that second information for first information acquired from a database is input by a user operation, and generating, in response to detecting an instruction to generate an object for the second information, a first object including the first information, a second object including the second information, and information indicating that the first object and the second object are in a correspondence relationship.

BRIEF DESCRIPTION OF THE DRAWINGS

FIG. 3 is a diagram illustrating contents of a sticky note management table stored in a sticky note management table data storage area of the information processing server according to the one embodiment of the present disclosure;

FIG. 20 is a diagram illustrating contents of the sticky note management table stored in the sticky note management table data storage area of the information processing server according to the one embodiment of the present disclosure;

DETAILED DESCRIPTION

An information processing device, an information processing method executed by the information processing device as an example of a computer, and a recording medium according to one embodiment of the present disclosure will be described in detail with reference to the drawings.

(Configuration of One Embodiment of the Present Disclosure)

Figure 1:
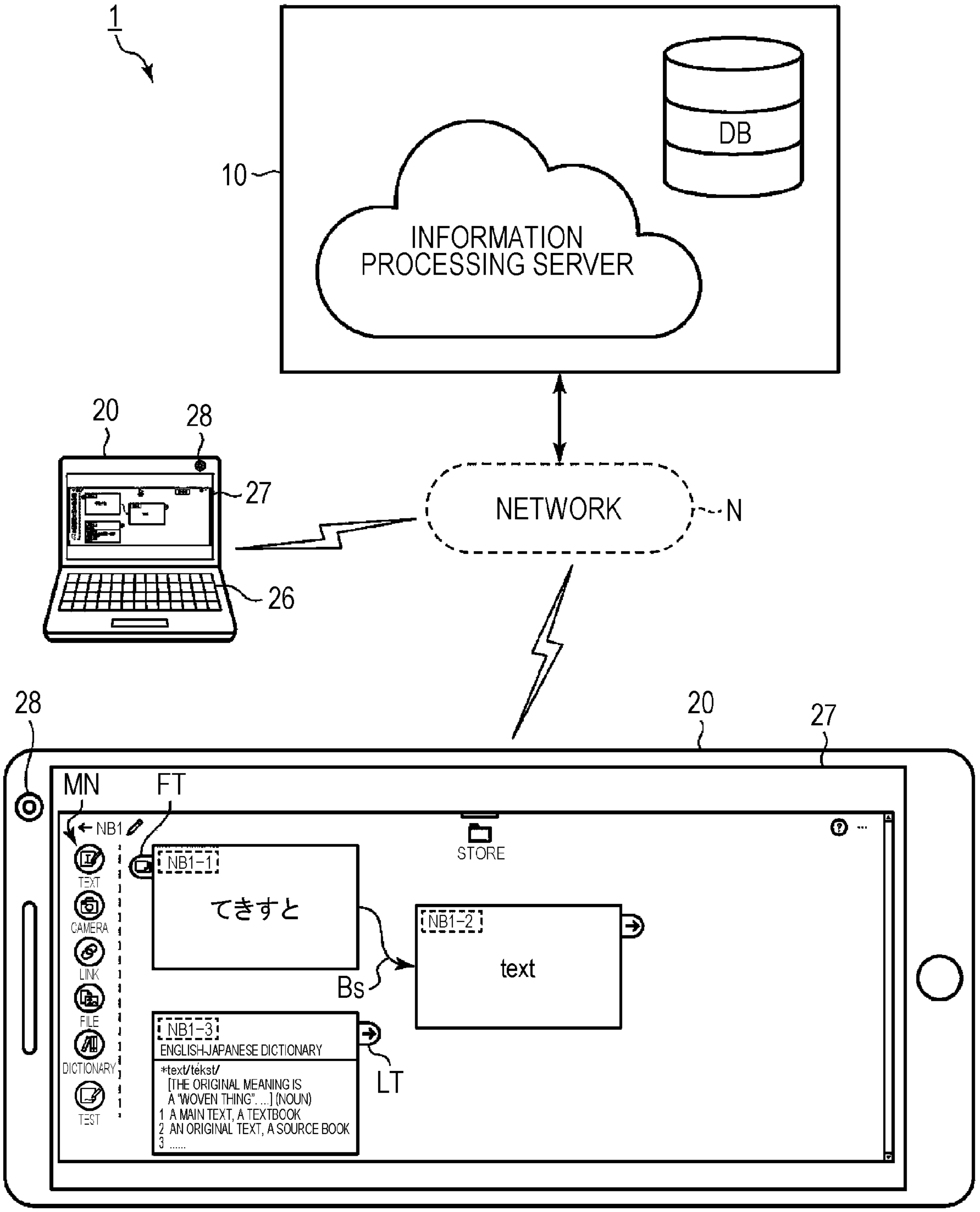
FIG. 1 is a diagram illustrating an overall configuration of an information processing system according to one embodiment of the present disclosure.

FIG. 1 is a diagram illustrating an overall configuration of an information processing system 1 according to the one embodiment of the present disclosure.

The information processing system 1 includes an information processing server 10 (server device) provided on a network N such as the Internet and a user terminal 20 (communication device) communicatively connected to the information processing server 10.

The information processing server 10 is a dedicated server that connects an information processing server use application for using the information processing server 10 and a cloud service.

Note that both the information processing server 10 and the user terminal 20 can be the information processing device according to the present disclosure. Hereinafter, a case will be described where the information processing server 10 executes various types of processing including creation and management of an electronic sticky note according to a user operation on an application (a web browser, a dedicated application, or the like) of the user terminal 20. In another embodiment, the various types of processing including creation and management of an electronic sticky note may be executed by the user terminal 20.

The user terminal 20 is, for example, a tablet terminal, a smartphone, a PC, an electronic dictionary, a mobile phone, an electronic book, a portable game machine, or the like having a communication function.

Although FIG. 1 illustrates two user terminals 20 communicatively connected to the information processing server 10, more user terminals 20 may be communicatively connected to the information processing server 10.

The information processing server use application (information processing server use app) is installed in the user terminal 20.

<Function of Information Processing Server 10>

The information processing server 10 has at least the following functions (10*a*) to (10*g*) in a state of being communicatively connected to the user terminal 20 according to the information processing server use app of the user terminal 20.

«Function (10*a*)»

Figure 7:
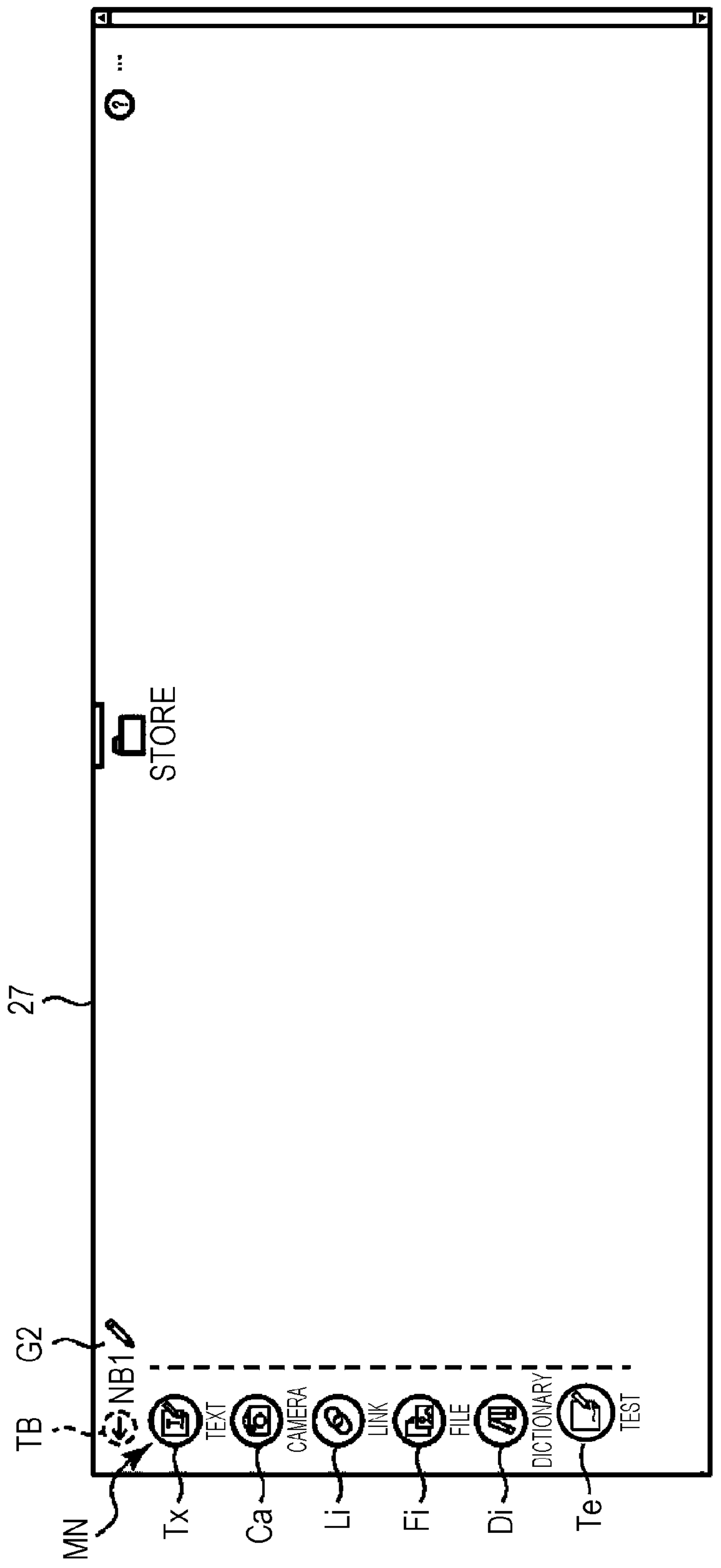
FIG. 7 is a diagram illustrating an example of a screen displayed on the display unit of the user terminal when the electronic sticky note creation processing illustrated in FIG. 5 is executed.

A function of creating a notebook screen G2 according to an operation of the user terminal 20 and displaying the created notebook screen G2 on a display unit 27 of the user terminal 20 (see, for example, FIG. 7). The notebook screen G2 is a display area (notebook NBm) in which a user can input and display optional information. Note that a symbol m indicates a natural number.

«Function (10*b*)»

A function of creating, according to a user operation on a notebook menu MN provided on the notebook screen G2, an electronic sticky note NBm-n to which information of a type selected from the notebook menu MN is input, and displaying the created electronic sticky note NBm-n at an optional position of the user in a notebook NB1. Note that a symbol n indicates a natural number.

«Function (10*c*)»

A function of moving a [line connection] tab LT added to a right end of the electronic sticky note NBm-n (in FIG. 1, an electronic sticky note NB1-1) to another electronic sticky note (in FIG. 1, an electronic sticky note NB1-2) in the notebook NBm (in FIG. 1, the notebook NB1) according to a user operation, and organizing the electronic sticky note NB1-1 and the electronic sticky note NB1-2 by sequentially connecting (performing line connection of) the electronic sticky note NB1-1 and the electronic sticky note NB1-2 in a line with a connection arrow Bs of a predetermined color (for example, blue).

«Function (10*d*)»

A function of performing folding so that, among the plurality of electronic sticky notes (in FIG. 1, the electronic sticky notes NB1-1 and NB1-2) organized by performing the connection (line connection) sequentially in a line, the first electronic sticky note (in FIG. 1, the electronic sticky note NB1-1) is on top and the second and subsequent electronic sticky notes (in FIG. 1, the electronic sticky note NB1-2) are below the first electronic sticky note to switch from an expanded state to be displayed within a predetermined range, according to a user operation on a [fold] tab FT added to a left end of the first electronic sticky note NB1-1 (see, for example, FIG. 12).

«Function (10*e*)»

A function of displaying, in the expanded manner as before, the plurality of electronic sticky notes (for example, the electronic sticky notes NB1-1 and NB1-2) displayed in the folded manner according to a user operation on an [expand] tab EXT (see, for example, FIG. 12) added to the left end of the first electronic sticky note (for example, the electronic sticky note NB1-1) among the plurality of electronic sticky notes (for example, the electronic sticky notes NB1-1 and NB1-2).

«Function (10*f*)»

A function of switching and displaying, like a slide show, the plurality of electronic sticky notes (for example, the electronic sticky notes NB1-1 to NB1-*n*) sequentially connected (subjected to line connection) in a line in an enlarged state sequentially from the first electronic sticky note (for example, the electronic sticky note NB1-1) to the last electronic sticky note (for example, an electronic sticky note NB1-*n*), according to a display mode selected according to a user operation.

«Function (10*g*)»

A function of creating corresponding two electronic sticky notes by batch processing and performing line connection of (connecting) the created two electronic sticky notes.

Note that, in the present embodiment, the connection of the electronic sticky notes is mainly to connect the plurality of the electronic sticky notes NBm-n sequentially in a line.

Furthermore, in the present embodiment, an expression of "organizing" the plurality of electronic sticky notes NBm-n may be used including bringing into a state where the plurality of electronic sticky notes NBm-n are classified and grouped so that the electronic sticky notes NBm-n can be identified and a state where the order can be identified.

Furthermore, in the present embodiment, a symbol NBm (NB1, NB2, or the like) indicates a notebook ID (identification information). The symbol NBm may be read as a notebook name input by the user. Furthermore, a symbol NBm-n (NB1-1, NB1-2, or the like) indicates an electronic sticky note ID created in the notebook NBm. The symbol NBm-n may be read as an electronic sticky note name input by the user.

Specifically, the notebook name may be, for example, a subject name of a subject that the user is learning, and the electronic sticky note name may be, for example, a unit name in the subject or a learning date and time.

<Electronic Circuit of Information Processing Server 10>

Figure 2:
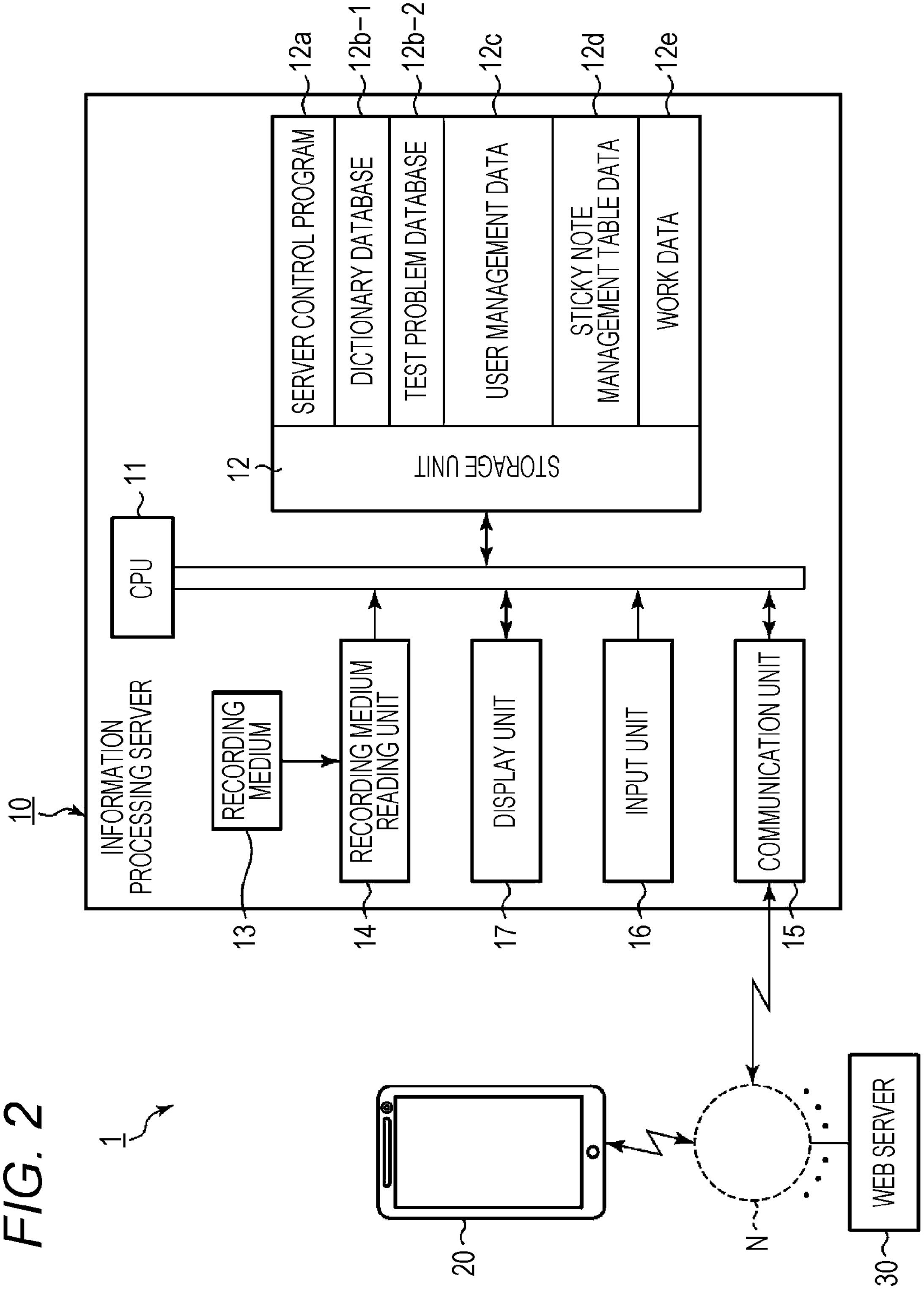
FIG. 2 is a block diagram illustrating a configuration of an electronic circuit of an information processing server according to the one embodiment of the present disclosure.

FIG. 2 is a block diagram illustrating a configuration of an electronic circuit of the information processing server 10.

The electronic circuit of the information processing server 10 includes a control unit (central processing unit (CPU)) 11 that is a computer, a storage unit 12, a recording medium reading unit 14, a communication unit 15, an input unit 16, and a display unit 17.

The control unit 11 controls, according to a server control program 12*a* stored in the storage unit 12, an operation of each unit of the circuit according to an input signal according to a user operation on the input unit 16 or a reception signal by the communication unit 15 from the user terminal 20 on the network N.

The server control program 12*a* may be stored in advance in the storage unit 12, may be stored in advance in an external recording medium 13 such as a compact disc read-only memory (CD-ROM) and read in the storage unit 12 via the recording medium reading unit 14, or may be downloaded from a web server (in this case, a program server) 30 on the network N and read and stored in the storage unit 12.

The server control program 12*a* includes a program for executing at least the above functions (10*a*) to (10*g*).

In the storage unit 12, in addition to a storage area of the server control program 12*a*, a dictionary database storage area 12*b*-1, a test question database storage area 12*b*-2, a user management data storage area 12*c*, a sticky note management table data storage area 12*d*, and a work data storage area 12*e* are secured.

In the dictionary database storage area 12*b*-1, various types of dictionary data such as an English-Japanese dictionary, a German-Japanese dictionary, a French-Japanese dictionary, and a Japanese dictionary are stored as dictionary data in which words that are entry words are associated with explanatory information such as translations, meanings of the words, example sentences, and explanations corresponding to the entry words. In the test question database storage area 12*b*-2, test question data such as an English speaking question and an English composition question to be described later is stored.

In the user management data storage area 12*c*, for each user (user ID (account)) of the user terminal 20 in which the information processing server use app is installed, a password registered by the user, a user attribute (occupation (school), grade, and the like), and data (notebook data) of content of the notebook NBm are stored in association with each other. The notebook data is data including content of the electronic sticky note NBm-n created according to a user operation, and is associated with a notebook ID and an electronic sticky note ID.

FIG. 3 is a diagram illustrating contents of a sticky note management table (notebook management table) 12*d* stored in the sticky note management table data storage area 12*d* of the information processing server 10.

In the sticky note management table (notebook management table) 12*d*, for each user ID stored (registered) in the user management data storage area 12*c*, an electronic sticky note ID of the electronic sticky note NBm-n included in the notebook NBm, a type of information selected from the notebook menu MN, an attribute (a creation/editing date and time, data setting information such as a data format, a sub-attribute, and the like) of data included in the electronic sticky note NBm-n, coordinates indicating a display position of the electronic sticky note NBm-n on the notebook NBm, a display size of the electronic sticky note NBm-n, a connection open/close flag, and a connection sticky note ID are stored in association with a notebook ID of the notebook NBm. The connection open/close flag indicates, in a case where an electronic sticky note is subjected to line connection (connected) to another electronic sticky note, whether to display the electronic sticky notes in an expanded manner or in a folded manner. The connection sticky note ID indicates electronic sticky note IDs of a connection destination and a connection source.

Note that, since the connection of the electronic sticky notes in the present embodiment is mainly to connect the plurality of electronic sticky notes (NB1-*n*) sequentially in a line, the number of electronic sticky note IDs of each of the connection destination and the connection source stored in the connection sticky note ID is limited to one at most. Thus, in a case where another electronic sticky note ID is already stored in the connection destination/connection source of the connection sticky note ID, new connection to the electronic sticky note is prohibited, so that the connection state of the electronic sticky notes can be prevented from branching into a plurality of columns.

The sticky note management table (notebook management table) 12*d* collectively stores management information regarding the plurality of electronic sticky notes (NB1-*n*/NB2-*n*/NBm-n) included in each of the plurality of notebooks (NB1, NB2, . . . ), and is also a management table of the notebook NBm in which the stored management information can be updated according to creation of the notebook NBm and the electronic sticky note NBm-n included in the notebook NBm and update of information.

In the work data storage area 12*e*, various types of data generated or acquired according to control of an operation of each unit by the control unit 11 are temporarily stored as necessary.

In the information processing server 10 configured as described above, the control unit 11 controls the operation of each unit of the circuit according to a command described in the server control program 12*a*, and software and hardware operate in cooperation with each other, thereby implementing various functions as described in operation description to be described later.

<Electronic Circuit of User Terminal 20>

Figure 4:
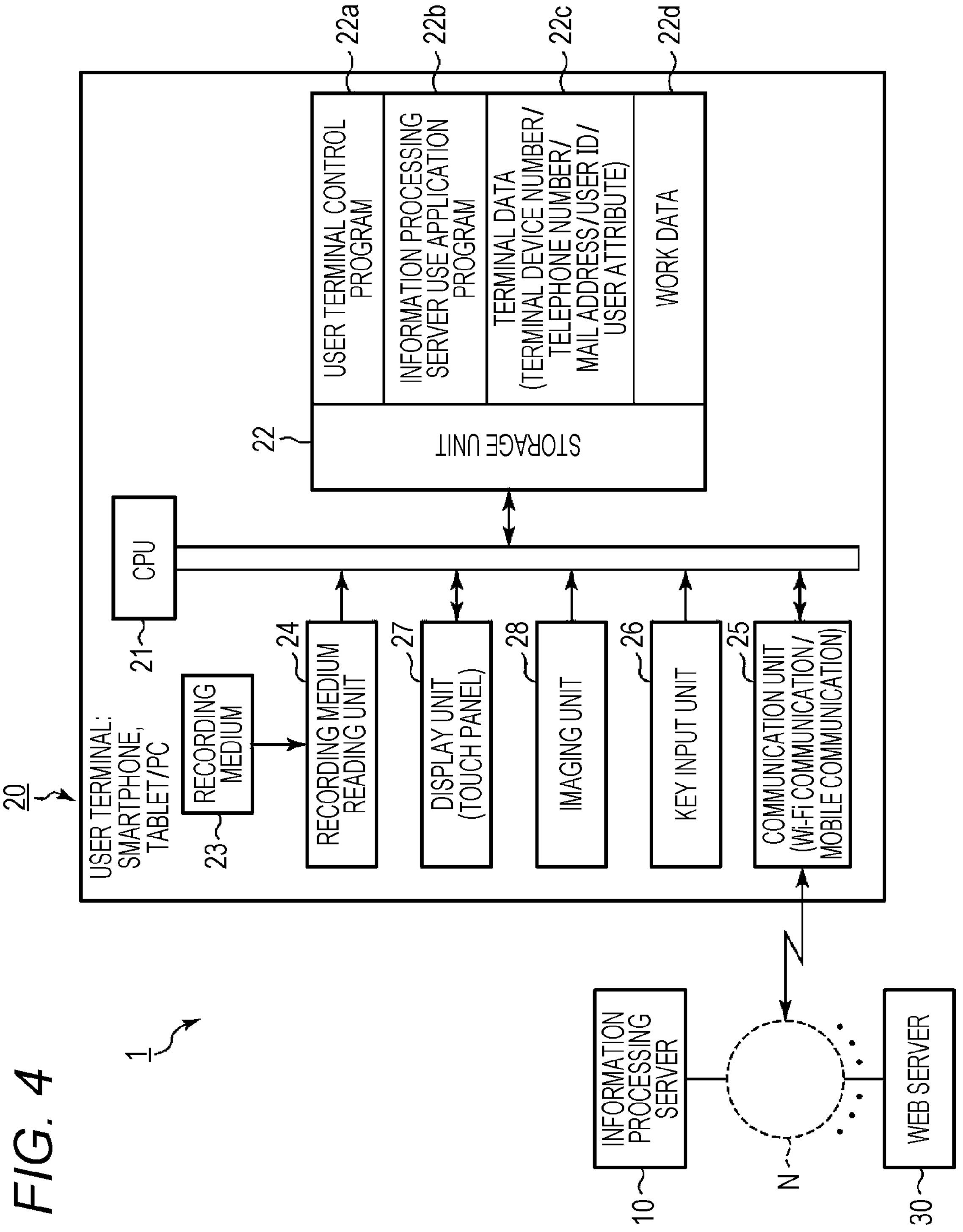
FIG. 4 is a block diagram illustrating a configuration of an electronic circuit of a user terminal according to the one embodiment of the present disclosure.

FIG. 4 is a block diagram illustrating a configuration of an electronic circuit of the user terminal 20.

The electronic circuit of the user terminal 20 includes a control unit (CPU) 21 that is a computer, a storage unit 22, a recording medium reading unit 24, a communication unit (Wi-Fi (registered trademark) communication/mobile communication) 25, a key input unit 26, the touch panel type display unit 27, and an imaging unit (camera) 28.

The control unit 21 controls an operation of each unit of the circuit according to a user terminal control program 22*a* and an information processing server use application (information processing server use app) 22*b* stored in the storage unit 22. The user terminal control program 22*a* may be stored in advance in the storage unit 22, may be read by the recording medium reading unit 24 from an external recording medium 23 such as a memory card and stored in the storage unit 22, or may be downloaded from the web server (here, the program server) 30 on the network N via the communication unit 25 and stored in the storage unit 22.

The information processing server use app 22*b* is downloaded from the web server (for example, the program server of an app store) 30 on the network N via the communication unit 25 and stored in the storage unit 22.

The user terminal control program 22*a* includes, in addition to a system program for controlling the entire user terminal 20, a program for establishing communication connection with an external communication device including the information processing server 10 and the web server 30 on the network N as needed in cooperation with various application programs stored in the storage unit 22.

The information processing server use app 22*b* includes a program for executing input/output processing of data according to the above functions (10*a*) to (10*g*) by establishing communication connection with the information processing server 10.

In addition to the storage unit 22, the recording medium reading unit 24, and the communication unit 25, the key input unit 26 including a power key and a volume adjustment key, the touch panel type display unit 27, the imaging unit (camera) 28, and the like are connected to the control unit 21 via a system and a data bus.

In the storage unit 22, in addition to a program storage area that stores the user terminal control program 22*a* and the information processing server use app 22*b*, a terminal data storage area 22*c*, a work data storage area 22*d*, and the like are secured.

In the terminal data storage area 22*c*, data such as a telephone number, a mail address, a user ID (account), and a user attribute (occupation (school)/grade) is stored as terminal data unique to the user terminal 20, in addition to a terminal device number for establishing communication connection with the external communication device including the information processing server 10 and the web server 30 on the network N.

In the work data storage area 22*d*, various types of data generated or acquired according to control of an operation of each unit by the control unit 21 are temporarily stored as necessary.

In the user terminal 20 configured as described above, the control unit 21 controls the operation of each unit of the circuit according to a command described in the user terminal control program 22*a* and the information processing server use app 22*b*, and software and hardware operate in cooperation with each other, thereby implementing various functions as described in operation description to be described later.

(Basic Electronic Sticky Note Processing)

Basic electronic sticky note processing executed by the information processing system 1 will be described.

Figure 5:
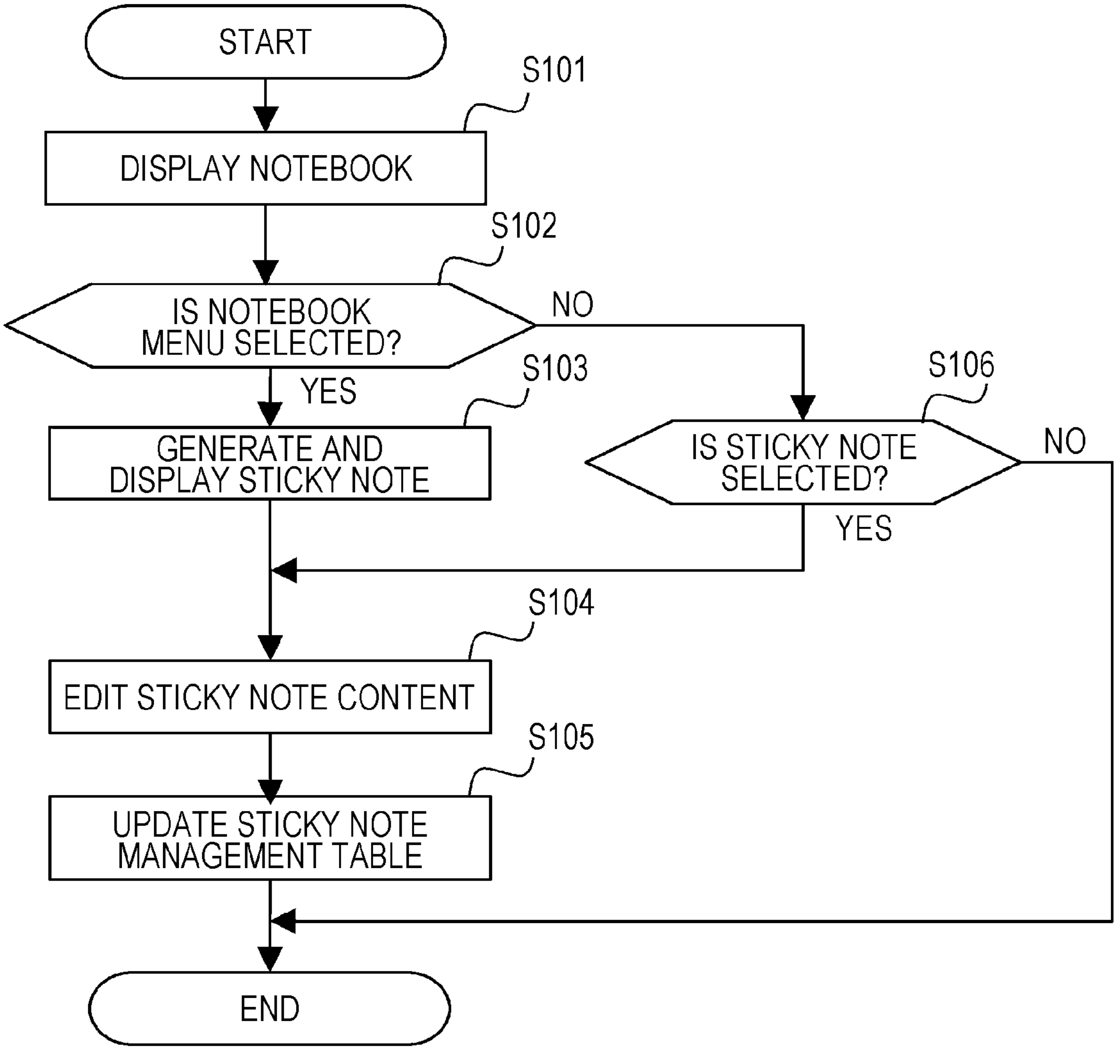
FIG. 5 is a flowchart illustrating electronic sticky note creation processing executed by the information processing server according to the one embodiment of the present disclosure.

FIG. 5 is a flowchart illustrating electronic sticky note creation processing according to the server control program 12*a* of the information processing server 10.

Figure 6:
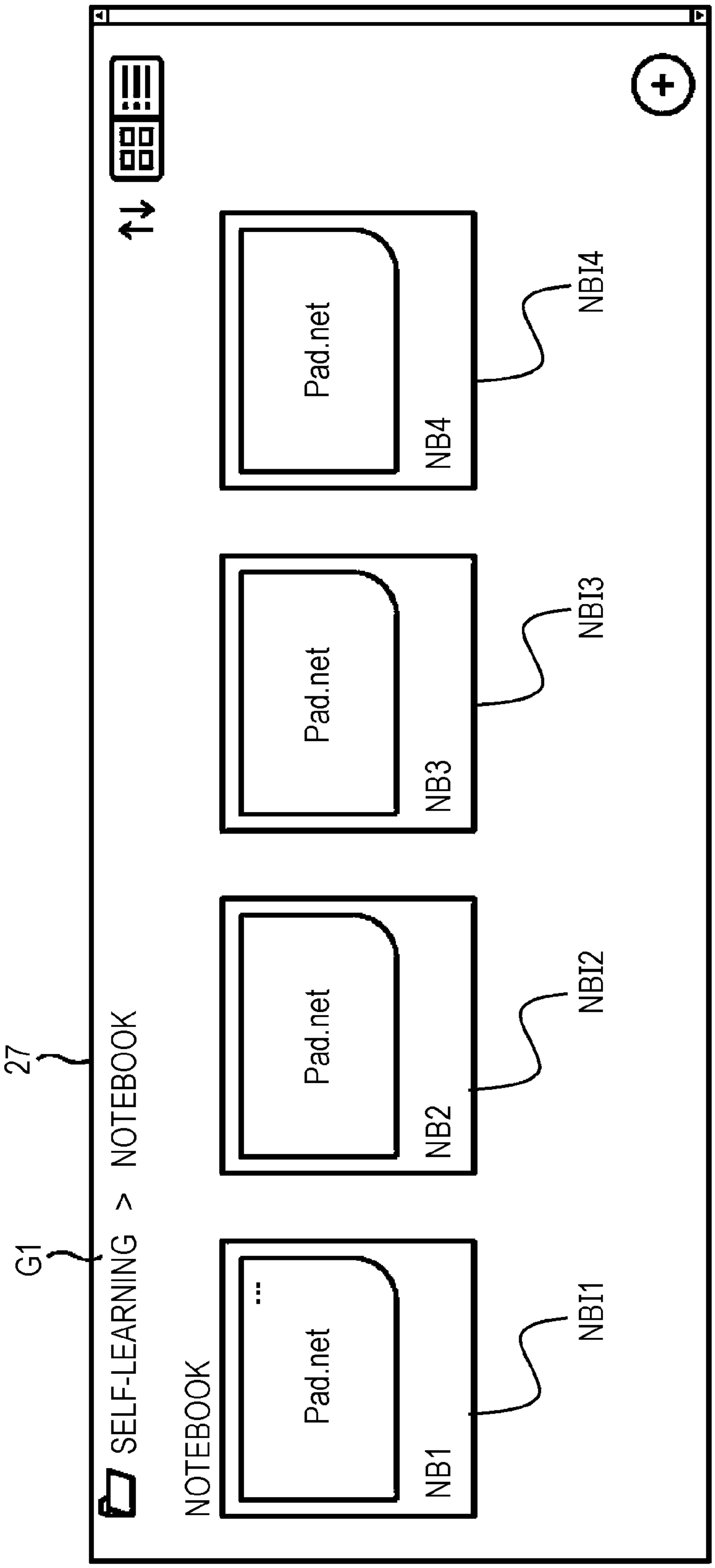
FIG. 6 is a diagram illustrating an example of a screen displayed on a display unit of the user terminal when the electronic sticky note creation processing illustrated in FIG. 5 is executed.
Figure 8:
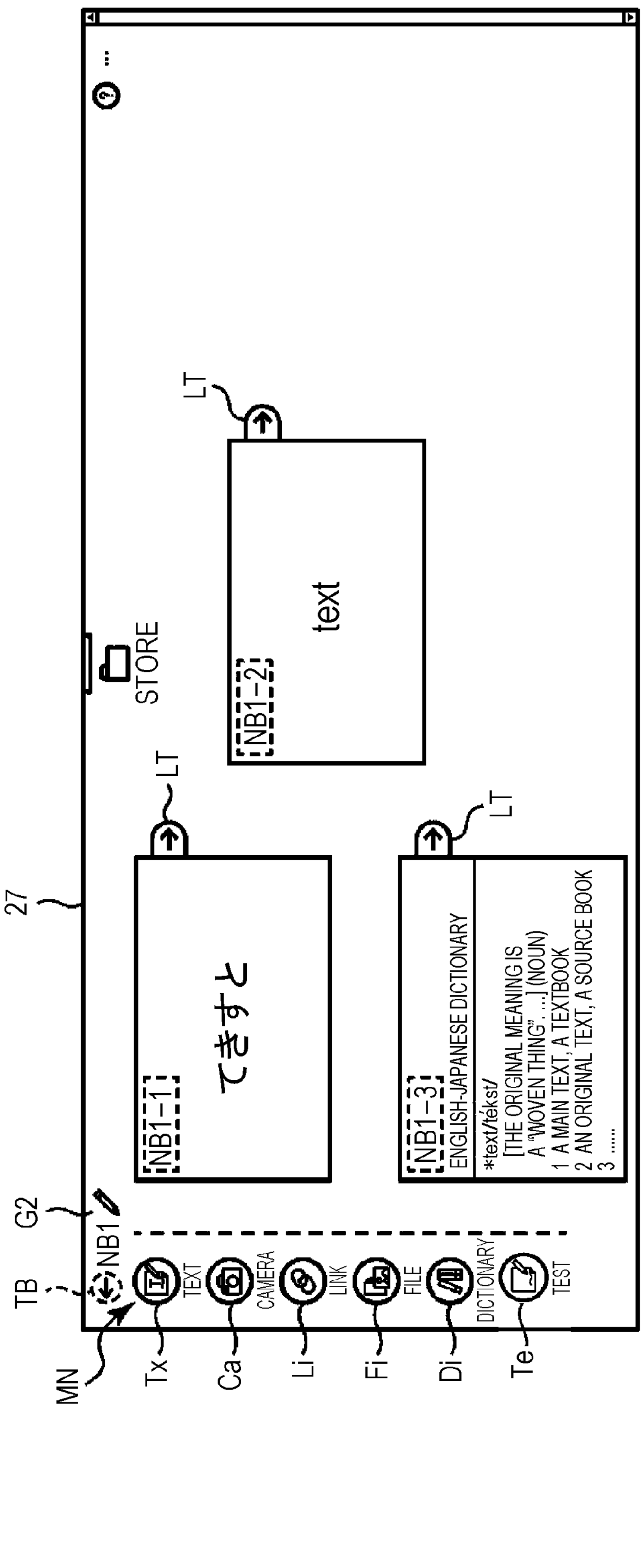
FIG. 8 is a diagram illustrating an example of a screen displayed on the display unit of the user terminal when the electronic sticky note creation processing illustrated in FIG. 5 is executed.

FIGS. 6 to 8 are diagrams illustrating examples of screens displayed on the display unit 27 of the user terminal 20 when the electronic sticky note creation processing illustrated in FIG. 5 is executed.

FIG. 6 illustrates an example of a notebook list screen G1 displayed on the display unit 27 of the user terminal 20.

The information processing server 10 is communicatively connected to the user terminal 20 in response to a login request from the user terminal 20. In this state, for example, as illustrated in FIG. 6, the control unit 11 displays the notebook list screen G1 on the display unit 27 of the user terminal 20.

In the notebook list screen G1 of FIG. 6, notebooks NBm (for example, notebooks NB1 to NB4) created according to a user operation are displayed in a list in a form of notebook icons NBI1 to NBI4.

FIG. 7 illustrates an example of the notebook screen G2 displayed on the display unit 27 of the user terminal 20.

It is assumed that a user performs a touch operation on a notebook icon (for example, the notebook icon NBI1) on the notebook list screen G1 to specify the notebook icon. In this case, the control unit 11 reads notebook data of the notebook NB1 specified by the user from the user management data storage area 12*c*, and displays the notebook data on the display unit 27 as the notebook screen G2 of the notebook NB1 as illustrated in FIG. 7 on the basis of the sticky note management table 12*d* (step S101).

In the example of FIG. 7, since no electronic sticky note NB1-*n* is created in the notebook NB1, a space for displaying the electronic sticky note NB1-*n* is blank.

When the user performs a touch operation on a [←] (close) button TB on the notebook screen G2, the control unit 11 causes the screen of the display unit 27 of the user terminal 20 to perform transition from the notebook screen G2 to the notebook list screen G1.

Note that, in the present embodiment, the touch operation on the display screen may be a click operation by a mouse cursor or a combination of a specification operation and a determination operation by another pointer device.

A case will be described where the user wants to create the electronic sticky note NB1-*n* to which optional information has been input by attaching the electronic sticky note NB1-*n* to the notebook NB1.

As illustrated in FIG. 7, the notebook menu MN is provided at a left end of the notebook screen G2. When the user selects a button (Tx/Ca/Li/Fi/Di/Te) indicating optional type of information from the notebook menu MN (step S102: YES), the control unit 11 creates the electronic sticky note NB1-*n* according to the selected type of information and displays the electronic sticky note NB1-*n* in the notebook NB1 (step S103).

The notebook menu MN includes, for example, a [text] button Tx, a [camera] button Ca, a [link] button Li, a [file] button Fi, a [dictionary] button Di, and a [test] button Te.

When the [text] button Tx is selected, the control unit 11 displays the new electronic sticky note NB1-*n* in the notebook NB1 and starts a text input app of the user terminal 20, and inputs an optional text according to a user operation to the electronic sticky note NB1-*n* to be displayed, and makes it editable (step S104).

When the [camera] button Ca is selected, the control unit 11 displays the new electronic sticky note NB1-*n* in the notebook NB1 and starts the imaging unit 28 of the user terminal 20, and inputs an optional photographic image captured by the imaging unit 28 to the electronic sticky note NB1-*n* to be displayed, and makes it editable (step S104).

When the [link] button Li is selected, the control unit 11 displays the new electronic sticky note NB1-*n* in the notebook NB1 and starts a web browser of the user terminal 20, and inputs an optional web page of the user to the electronic sticky note NB1-*n* to be displayed, and makes it editable (step S104).

When the [file] button Fi is selected, the control unit 11 displays the new electronic sticky note NB1-*n* in the notebook NB1 and starts a file operation app of the user terminal 20, and inputs an optional file of the user to the electronic sticky note NB1-*n* to be displayed, and makes it editable (step S104).

When the [dictionary] button Di is selected, the control unit 11 displays the new electronic sticky note NB1-*n* in the notebook NB1 and starts a dictionary app of the information processing server 10, and searches the dictionary database 12*b*-1 for an entry word of an optional dictionary of the user and explanatory information thereof to be displayed on the electronic sticky note NB1-*n*, and makes it editable (step S104).

When the [test] button Te is selected, the control unit 11 displays the new electronic sticky note NB1-*n* in the notebook NB1 and starts a test app of the information processing server 10, and displays a test question specified by the user on the electronic sticky note NB1-*n*, so that an input (answer) to the test question is possible (step S104).

Note that the notebook menu MN may include a button for inputting another type of information instead of or in addition to the [text] button Tx, the [camera] button Ca, the [link] button Li, the [file] button Fi, the [dictionary] button Di, and the [test] button Te.

The control unit 11 moves a display position of the electronic sticky note NB1-*n* displayed in the notebook NB1 according to a touch operation and dragging (moving) by the user.

The control unit 11 may change a color of the electronic sticky note NB1-*n* created in the notebook NB1 to an optional color according to a user operation.

The control unit 11 stores the type, the attribute, the coordinates, the size, the connection open/close flag, and the connection sticky note ID of the sticky note management table 12*d* in association with an electronic sticky note ID of the electronic sticky note NB1-*n* created in the notebook NB1 (step S105).

FIG. 8 illustrates an example of a screen displayed on the display unit 27 of the user terminal 20 through such processing. The example of the screen of FIG. 8 indicates a state where the three electronic sticky notes NB1-1 to NB1-3 are displayed. In FIG. 8, the electronic sticky note NB1-1 and the electronic sticky note NB1-2 are created by inputting a text on the basis of an operation of the [text] button Tx. The electronic sticky note NB1-3 is created by searching for an entry word of a dictionary and explanatory information thereof on the basis of an operation of the [dictionary] button Di.

When the optional electronic sticky note NB1-*n* is selected (step S106: YES) in a state where the notebook screen G2 of the notebook NB1 including the plurality of the electronic sticky notes NB1-*n* is displayed (step S101), the control unit 11 makes content of the selected electronic sticky note NB1-*n* additionally editable on the basis of the notebook menu MN in a similar manner to that described above (step S104).

Figure 9:
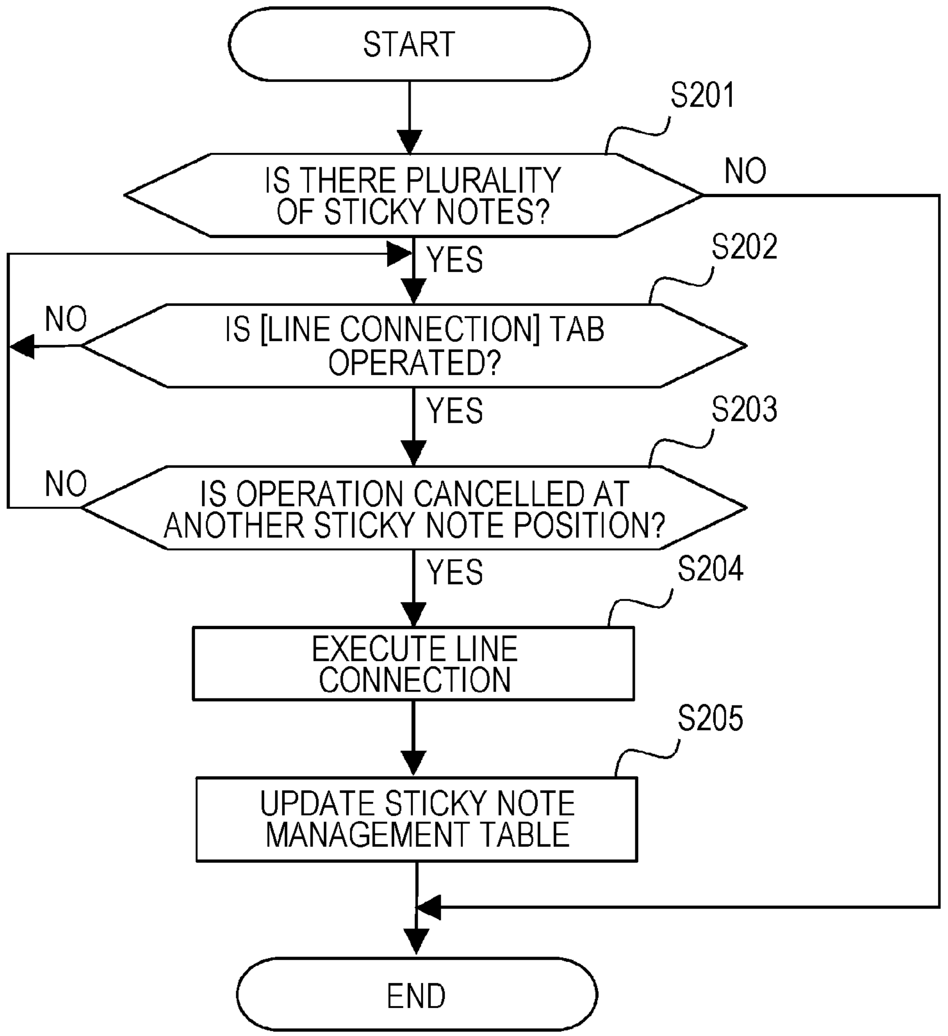
FIG. 9 is a flowchart illustrating line connection processing executed by the information processing server according to the one embodiment of the present disclosure.
Figure 10:
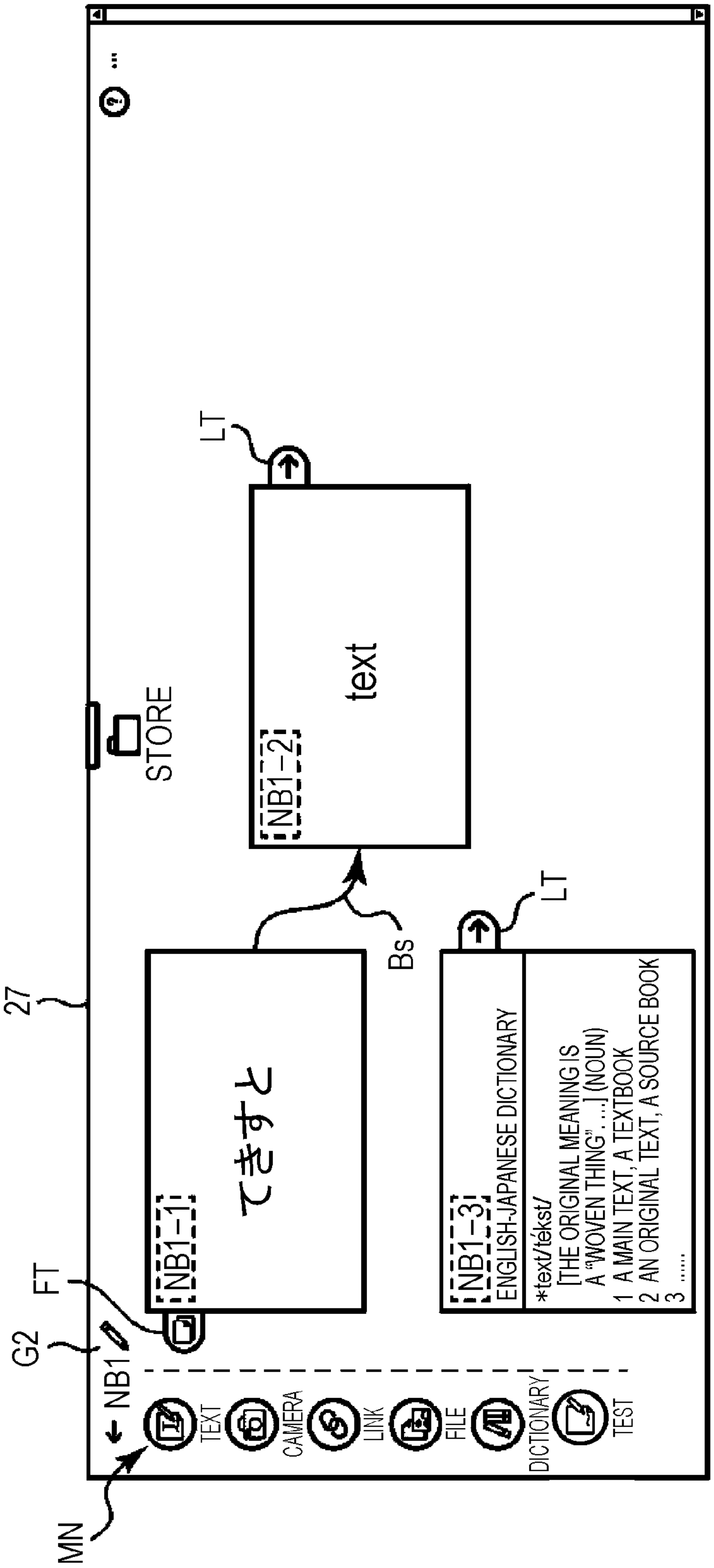
FIG. 10 is a diagram illustrating an example of a screen displayed on the display unit of the user terminal when the line connection processing illustrated in FIG. 9 is executed.

FIG. 9 is a flowchart illustrating line connection processing according to the server control program 12*a* of the information processing server 10. FIG. 10 illustrates an example of a screen including electronic sticky notes grouped by the line connection processing.

For example, a case will be described where, as illustrated in FIG. 8, there is the plurality of electronic sticky notes NB1-*n* included in the notebook NB1 in a state where the notebook screen G2 is displayed on the display unit 27 of the user terminal 20. In this case (step S201: YES), the control unit 11 stands by for a touch operation on the [line connection] tab LT added to the electronic sticky note NB1-*n* (step S202).

For example, in a case where the user wants to perform line connection of (connect) the electronic sticky note NB1-1 and the electronic sticky note NB1-2 by a manual operation and group them, the user moves (drags) the [line connection] tab LT of the electronic sticky note NB1-1 in a state where the [line connection] tab LT is touched (step S202: YES). When this drag operation is canceled at a display position of the electronic sticky note NB1-2 (step S203: YES), as illustrated in FIG. 10, the control unit 11 connects (performs line connection of) the electronic sticky note NB1-1 and the electronic sticky note NB1-2 with a solid blue connection arrow Bs from a connection source to a connection destination (step S204).

The control unit 11 updates the connection open/close flag and the connection sticky note ID of the sticky note management table 12*d* on the basis of the electronic sticky note NB1-1 and the electronic sticky note NB1-2 that are connected (subjected to the line connection) (step S205).

Thus, the user can manually connect (performs line connection of) the plurality of electronic sticky notes NB1-*n* created in the notebook NB1 on the basis of an optional relationship of the user, and group and organize the plurality of electronic sticky notes NB1-*n*.

Note that the connection arrow that connects (performs line connection of) the plurality of electronic sticky notes NB1-*n* may be deleted according to a user operation. When the connection arrow is deleted, the connection (line connection) is also canceled.

Figure 11:
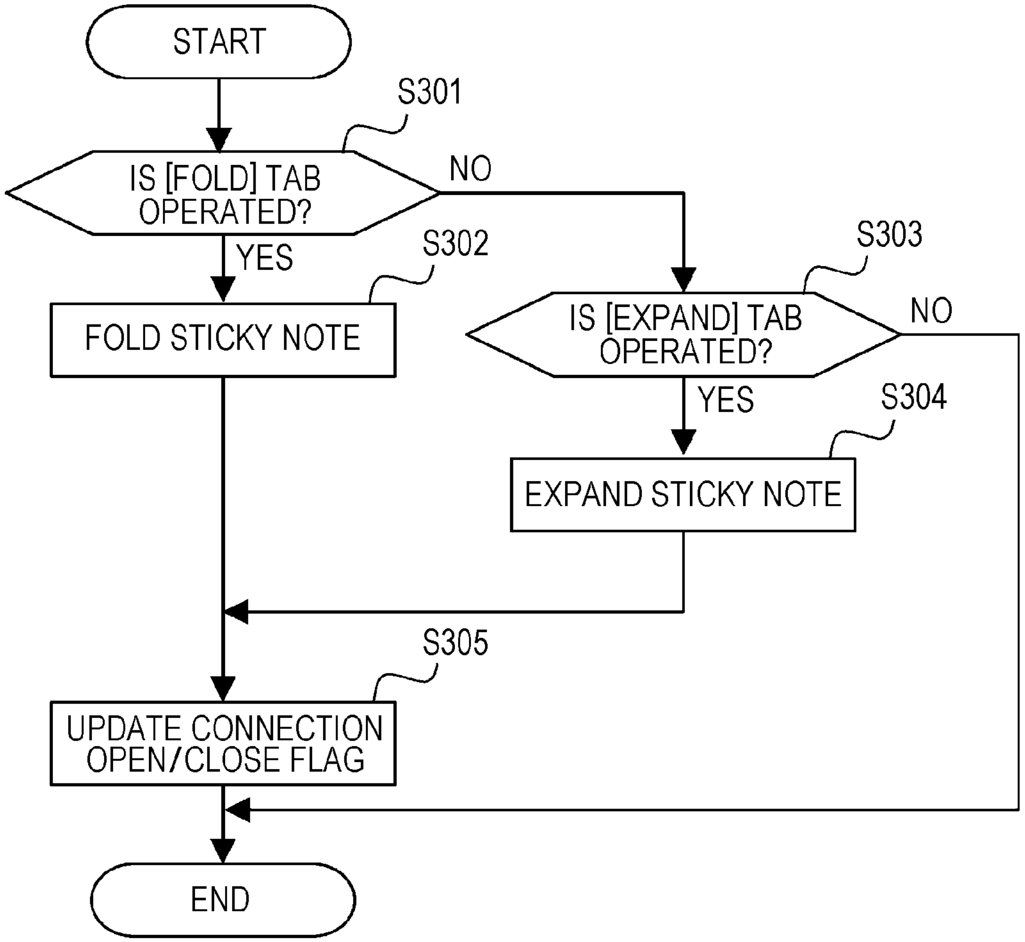
FIG. 11 is a flowchart illustrating electronic sticky note opening/closing processing executed by the information processing server according to the one embodiment of the present disclosure.

FIG. 11 is a flowchart illustrating electronic sticky note opening/closing (expanding/folding) processing according to the server control program 12*a* of the information processing server 10. FIG. 12 illustrates an example of a screen at the time of a folding operation in the electronic sticky note opening/closing processing.

For example, a case will be described where, as illustrated in FIG. 10, the electronic sticky note NB1-1 and the electronic sticky note NB1-2 are displayed in the state of being subjected to line connection (connected) by the connection arrow Bs. In this case, when a touch operation is performed on the [fold] tab FT added to a left end of the first electronic sticky note NB1-1 that is subjected to the line connection (connected) (step S301: YES), as illustrated in FIG. 12, the control unit 11 displays, in a folded manner, the electronic sticky note NB1-1 and the electronic sticky note NB1-2 that are displayed in an expanded manner so that the first electronic sticky note NB1-1 is on top and the second and subsequent electronic sticky notes (here, the electronic sticky note NB1-2) are overlapped below the first electronic sticky note NB1-1 in such a way as to sequentially shift positions of the electronic sticky notes (step S302).

The control unit 11 updates the connection open/close flag of the sticky note management table 12*d* according to the electronic sticky note NB1-1 and the electronic sticky note NB1-2 displayed in the folded manner (step S305).

Thus, for example, even when the number of the plurality of electronic sticky notes NBm-n created in the notebook NBm increases and the display becomes complicated, the user can organize the plurality of electronic sticky notes NBm-n grouped by the line connection (connection) as the simple notebook screen G2 by displaying the plurality of electronic sticky notes NBm-n in the folded manner.

Note that the display form in which the electronic sticky note NB1-1 and the electronic sticky note NB1-2 that are subjected to the line connection (connected) are displayed in the folded manner is not limited to the display form in which the electronic sticky notes NB1-*n* are displayed in the overlapping manner in the order of the line connection, and may be a display form in which the electronic sticky notes NB1-*n* are displayed in a line in a vertical or horizontal direction in the order of the line connection.

Figure 12:
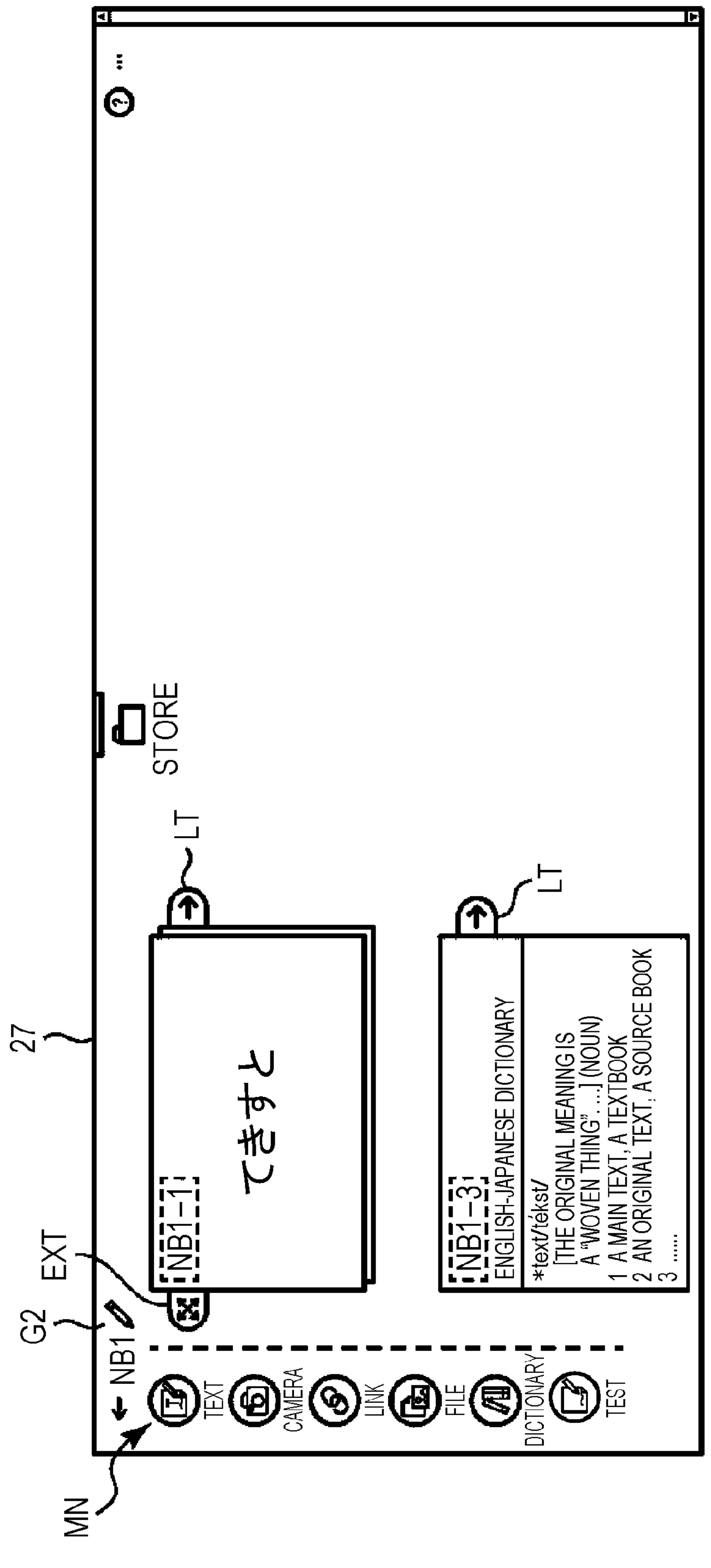
FIG. 12 is a diagram illustrating an example of a screen displayed on the display unit of the user terminal when the electronic sticky note opening/closing processing illustrated in FIG. 11 is executed.

As illustrated in FIG. 12, the [expand] tab EXT is added to the left end of the first electronic sticky note NB1-1 displayed in the folded manner. When the touch operation is performed on the [expand] tab EXT (step S303: YES), as illustrated in FIG. 10, the control unit 11 displays, in the expanded manner as before, the second and subsequent electronic sticky notes (here, the electronic sticky note NB1-2) connected to the first electronic sticky note NB1-1 on the basis of the sticky note management table 12*d* (step S304).

The control unit 11 updates the connection open/close flag of the sticky note management table 12*d* according to the electronic sticky notes NB1-1 and NB1-2 (step S305) displayed in an expanded manner.

The user can easily confirm content of each of the grouped electronic sticky notes NBm-n and a relationship therebetween by displaying, in the expanded manner as necessary, the plurality of electronic sticky notes NBm-n displayed in the folded state.

Note that, in the line connection processing of FIG. 9, the plurality of electronic sticky notes that is connected (subjected to the line connection) are first displayed in the expanded state, but in another embodiment, the plurality of electronic sticky notes that is connected (subjected to line connection) may be first displayed in the folded state.

(Exchange Between Users Using Electronic Sticky Note)

When detecting that second information (for example, an answer to a test question by a first user) for first information (for example, the test question) acquired from a database (for example, the test question database storage area 12*b*-2) is input by a user operation and detecting an instruction to generate an object for the second information, the control unit 11 included in the information processing server 10 as an example of the information processing device executes processing of generating a first object including the first information (for example, an electronic sticky note including the test question), a second object including the second information (for example, an electronic sticky note including the answer to the test question), and information indicating that the first object and the second object are in a correspondence relationship. What includes the first object, the second object, and the information indicating that the first object and the second object are in a correspondence relationship, which are generated in this processing, is described as "corresponding object information".

In the information processing system 1 according to the present embodiment, for example, a second user can evaluate a written answer or a speaking answer to the test question by the first user through exchange between the users of the corresponding object information obtained by such processing.

In this example, the test question and the answer thereof are associated with each other in the corresponding object information. Therefore, the second user can specify which test question the answer is for only by viewing this information. The second user can easily specify the answer to the test question even when a considerable amount of time has passed since the test question was asked. The second user does not need to search for the test question corresponding to the answer one by one.

As described above, according to the present embodiment, convenience when evaluation of information in a correspondence relationship such as a test question and an answer thereof (for example, scoring for the answer) is performed is improved.

There are a wide variety of answers that can be evaluated by the second user in the information processing system 1. In the information processing system 1, it is possible to evaluate an answer having no determined answer, such as a written answer or a speaking answer.

Exemplarily, the second user can evaluate a response to a question in an interview (such as a verbal response of the first user), an answer to an English composition question (such as English text or a speaking answer created by the first user), a report (such as a presentation material or a paper) for a task (such as a research theme), and a work (such as a song created by the first user or a picture drawn by the first user) for a task (such as composition or sketch).

As described above, the first information included in the first object is, for example, a question in an interview, an English composition question, or a task, and includes at least one element of a character, a sound, a still image, and a moving image. The second information included in the second object is, for example, a response to a question in an interview, an answer to an English composition question, or a report, a created song, or a drawn picture for a task, and includes at least one element of a character, a sound, a still image, and a moving image.

Hereinafter, as an example, a case will be described where a teacher (an example of the second user) scores a voice answer of a student (an example of the first user) to an English speaking question.

Figure 13:
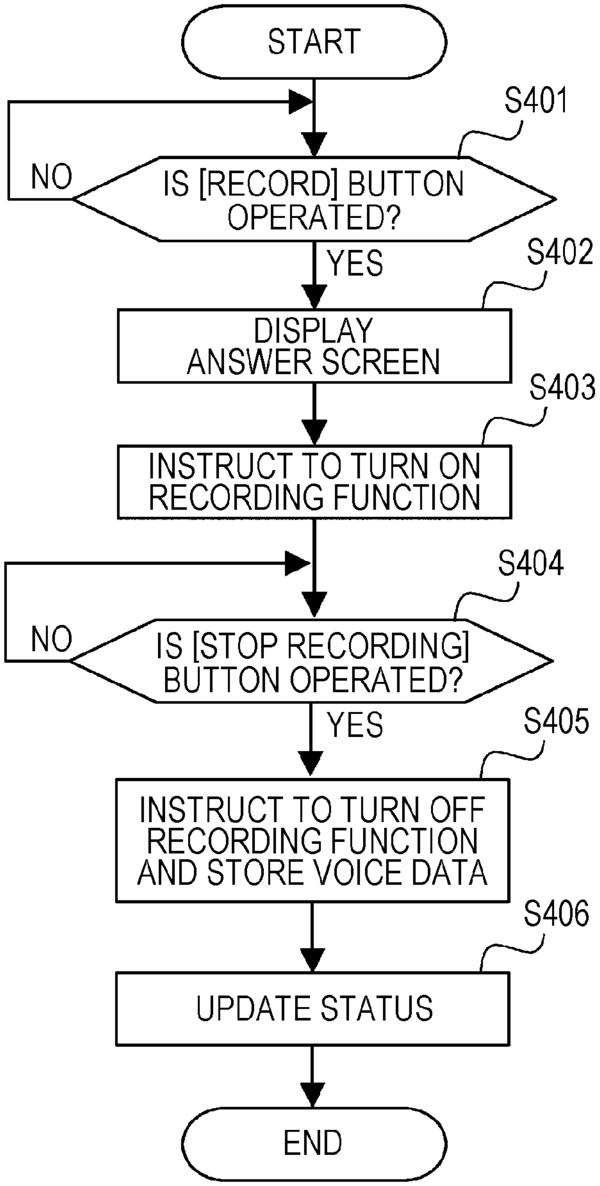
FIG. 13 is a flowchart illustrating recoding data registration processing executed by the information processing server according to the one embodiment of the present disclosure.
Figure 14:
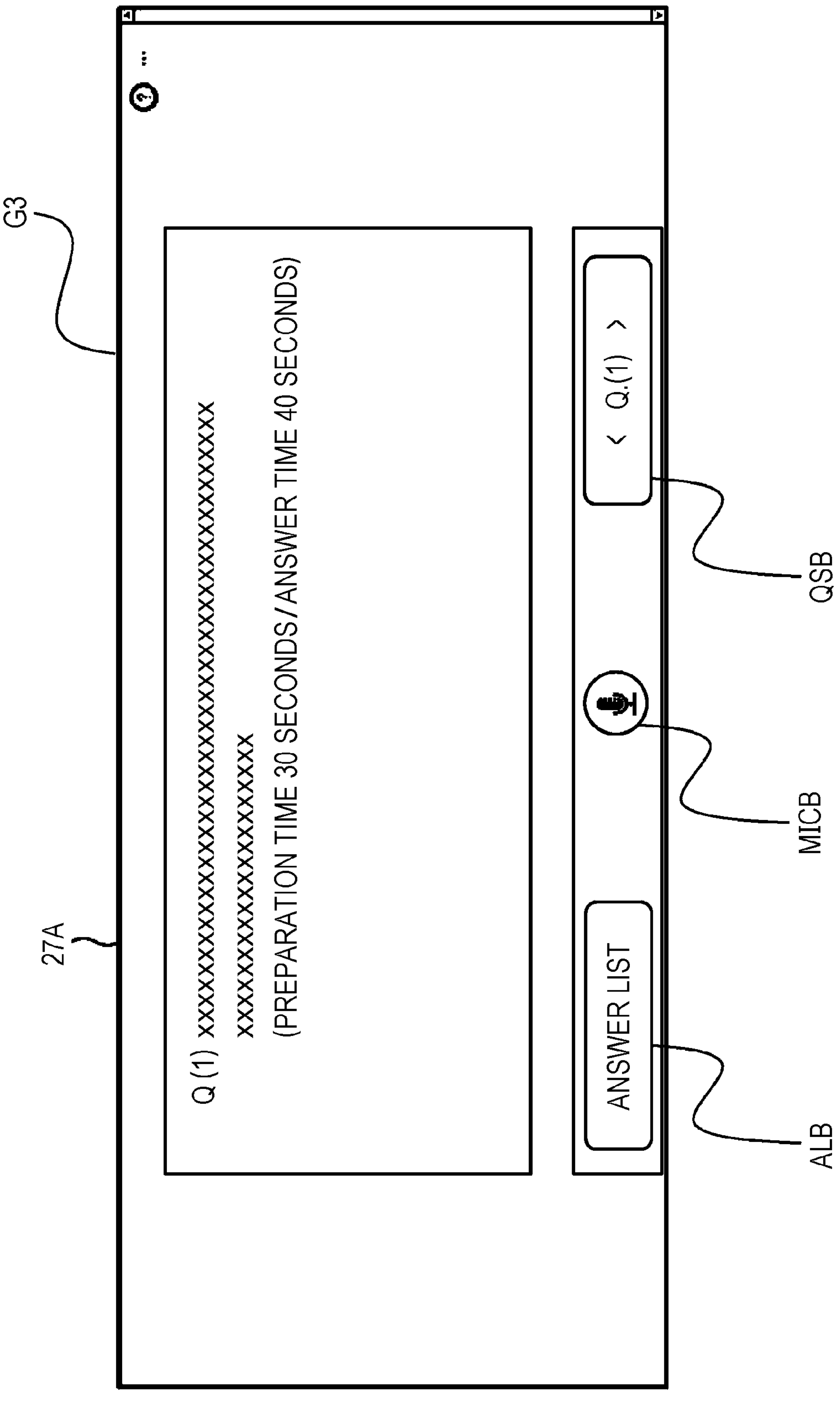
FIG. 14 is a diagram illustrating an example of a screen displayed on the display unit of the user terminal when the recoding data registration processing illustrated in FIG. 13 is executed.
Figure 15:
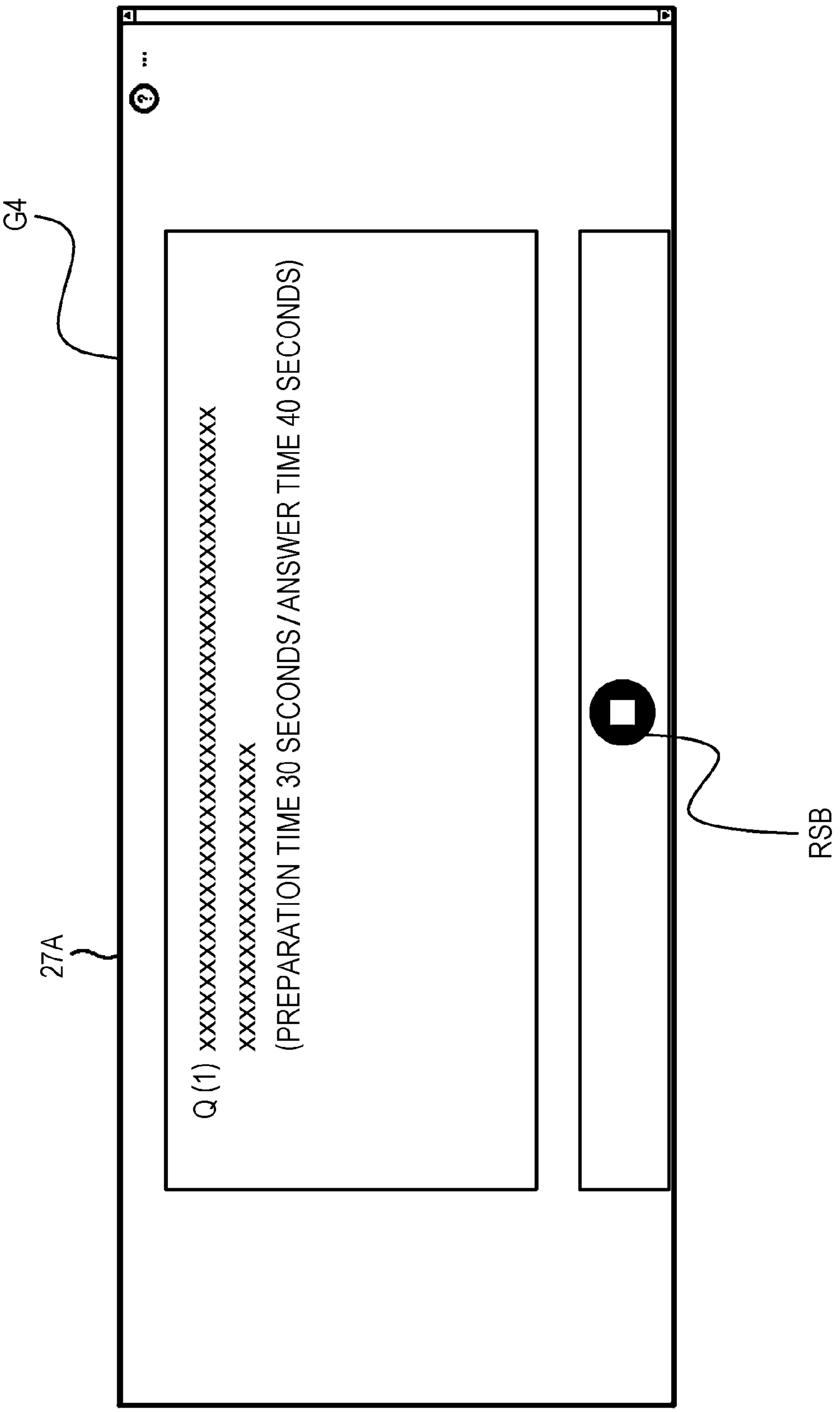
FIG. 15 is a diagram illustrating an example of a screen displayed on the display unit of the user terminal when the recoding data registration processing illustrated in FIG. 13 is executed.

FIG. 13 is a flowchart illustrating recoding data registration processing according to the server control program 12*a* of the information processing server 10. FIGS. 14 and 15 are diagrams illustrating examples of screens displayed on the display unit 27 of the user terminal 20 of the student at the time of the recoding data registration processing. For convenience, the user terminal 20 of the student is described as a "student terminal 20", and the display unit 27 of the student terminal 20 is described as a "display unit 27A". Furthermore, the user terminal 20 of the teacher is described as a "teacher terminal 20", and the display unit 27 of the teacher terminal 20 is described as a "display unit 27B".

When detecting a predetermined user operation on the student terminal 20, the control unit 11 performs transition to an answer mode. When detecting a touch operation on the [test] button Te in the answer mode, the control unit 11 starts the test app of the information processing server 10, reads test question data specified by the user (here, English speaking question) from the test question database storage area 12*b*-2, transmits the test question data to the student terminal 20, and displays the test question data on the display unit 27A.

FIG. 14 illustrates an example of a test question screen G3 displayed on the display unit 27A. In the example of FIG. 14, the test question screen G3 including the English speaking question (here, a question Q(1)) is displayed on the display unit 27A, and the speaking question is read aloud by voice from a speaker mounted on the student terminal 20. When the reading-aloud by voice is finished, an [answer list] button ALB, a [select question] button QSB, and a [record] button MICB are displayed on the test question screen G3.

The control unit 11 stands by for a touch operation on each button. For example, when detecting a touch operation on the [answer list] button ALB, the control unit 11 displays an answer list exemplified in FIG. 17 (described later) on the display unit 27A.

When detecting a touch operation on the [select question] button QSB, the control unit 11 displays a question immediately before or after the currently displayed question on the display unit 27A.

When detecting a touch operation on the [record] button MICB (step S401: YES), the control unit 11 displays an answer screen G4 exemplified in FIG. 15 on the display unit 27A (step S402), and instructs the student terminal 20 to turn on a recording function mounted on the student terminal 20 (step S403). Thus, the recording function is turned on in the student terminal 20.

On the answer screen G4 illustrated in FIG. 15, a [stop recording] button RSB is displayed together with the English speaking question.

In a state where the answer screen G4 is displayed on the display unit 27A, the control unit 11 stands by for a touch operation on the [stop recording] button RSB (step S404).

When detecting the touch operation on the [stop recording] button RSB (step S404: YES), the control unit 11 instructs the student terminal 20 to turn off the recording function and store recording data (step S405). Thus, the recording function is turned off in the student terminal 20, and the recording data (here, a voice answer by the student) is stored in the storage unit 22.

The control unit 11 updates a status (answered/unanswered) of the student for the test question (step S406). Here, the status of the student for the question Q(1) is changed from "unanswered" to "answered". This status is managed in, for example, the user management data storage area 12*c*.

Figure 16:
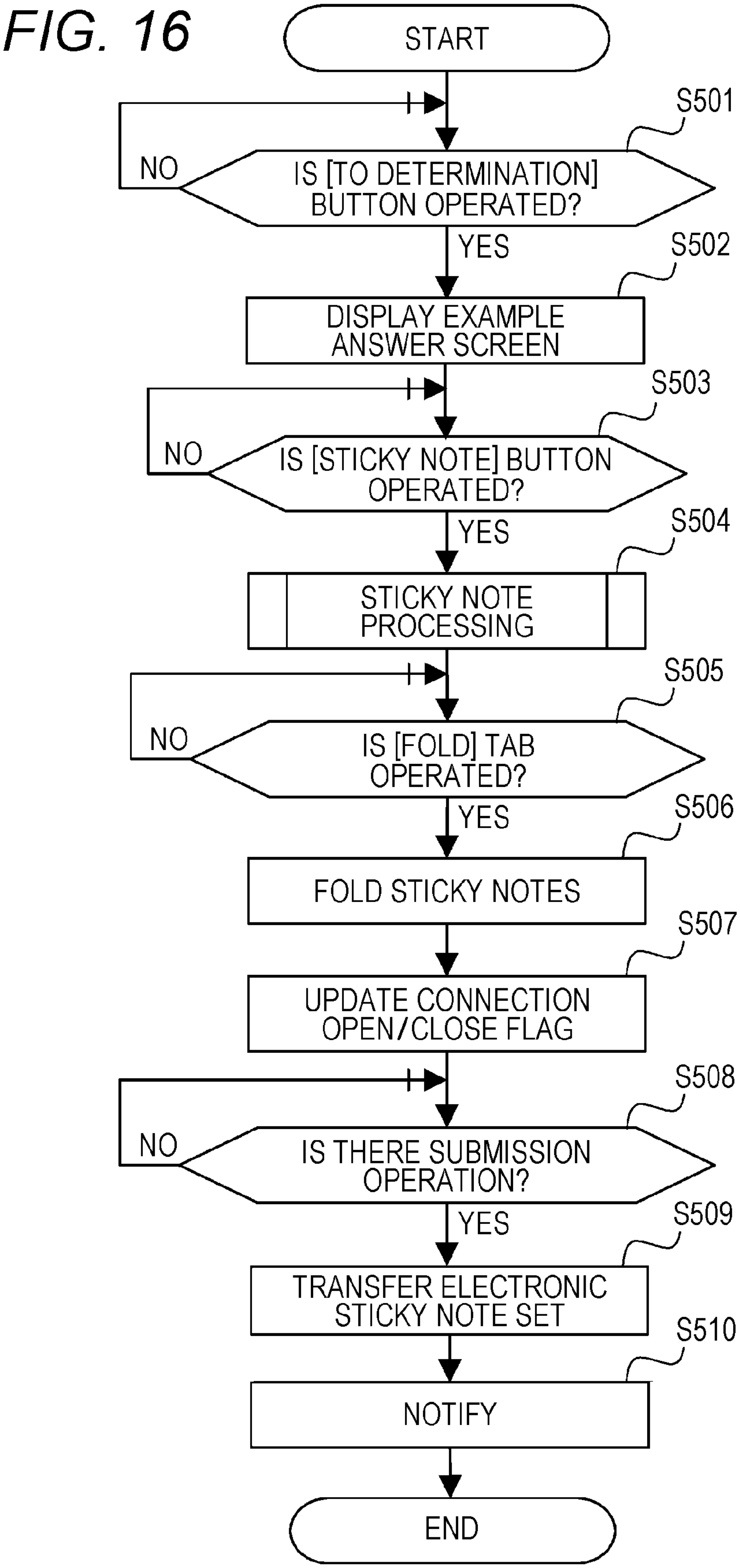
FIG. 16 is a flowchart illustrating answer submission processing executed by the information processing server according to the one embodiment of the present disclosure.
Figure 17:
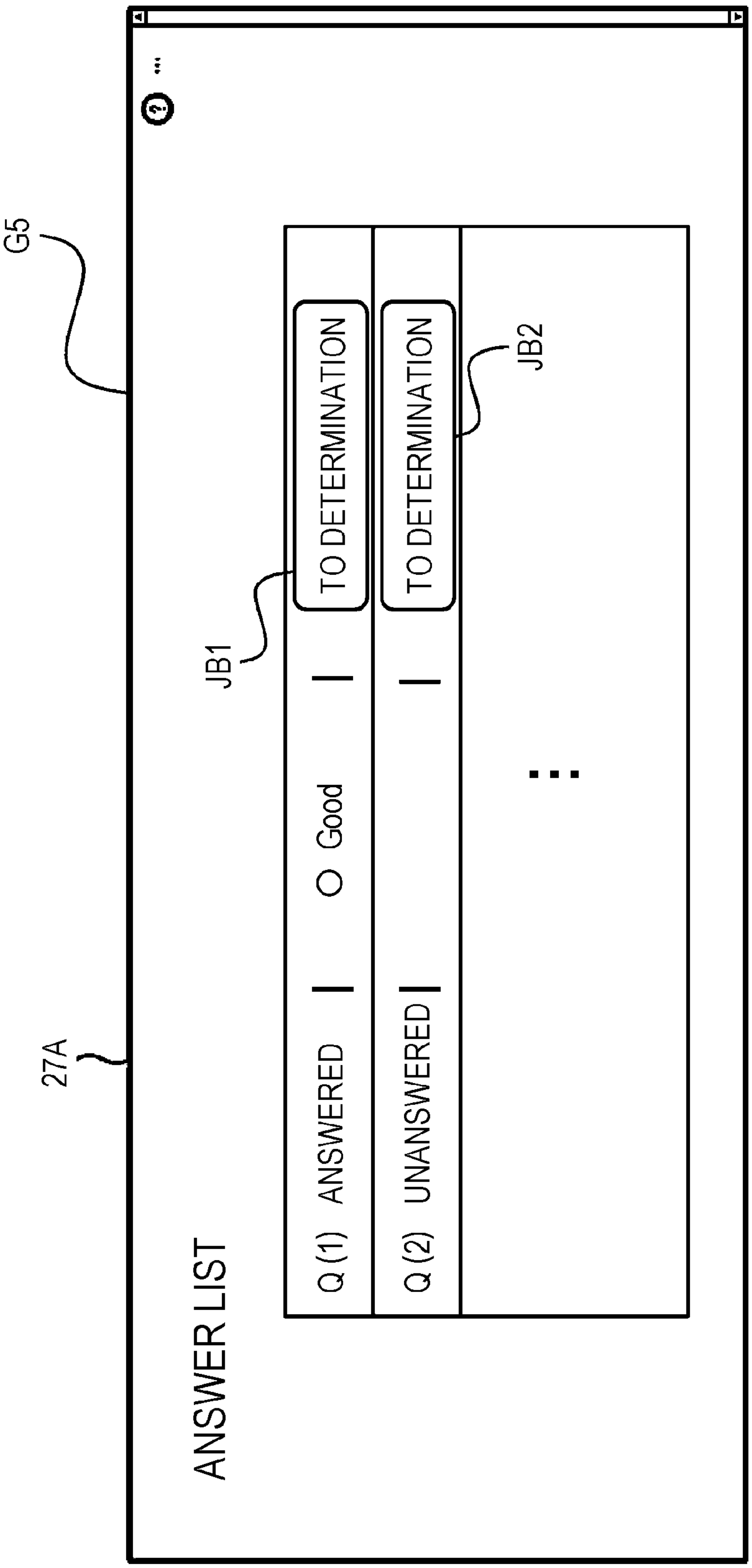
FIG. 17 is a diagram illustrating an example of a screen displayed on the display unit of the user terminal when the answer submission processing illustrated in FIG. 16 is executed.
Figure 18:
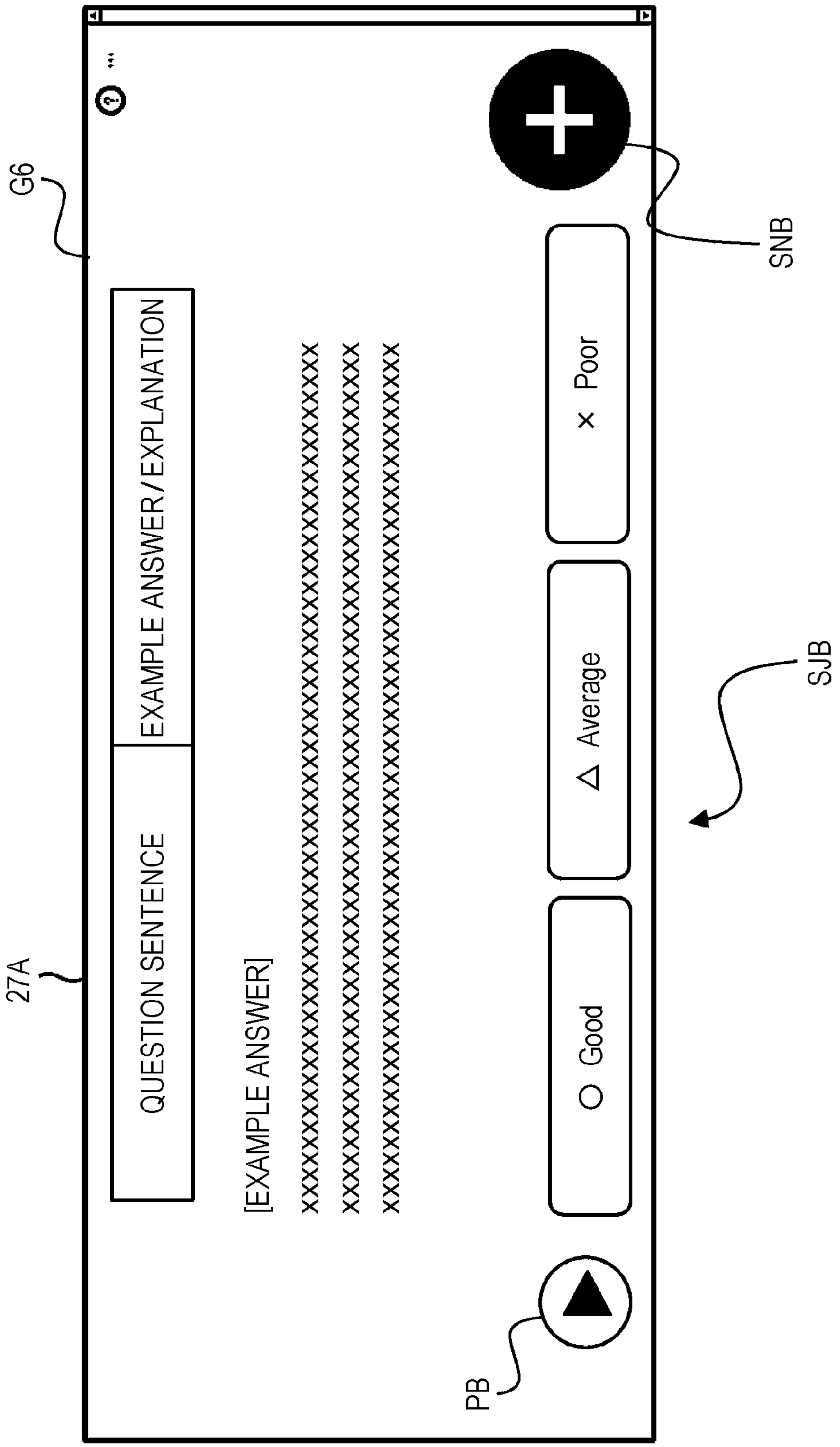
FIG. 18 is a diagram illustrating an example of a screen displayed on the display unit of the user terminal when the answer submission processing illustrated in FIG. 16 is executed.
Figure 21:
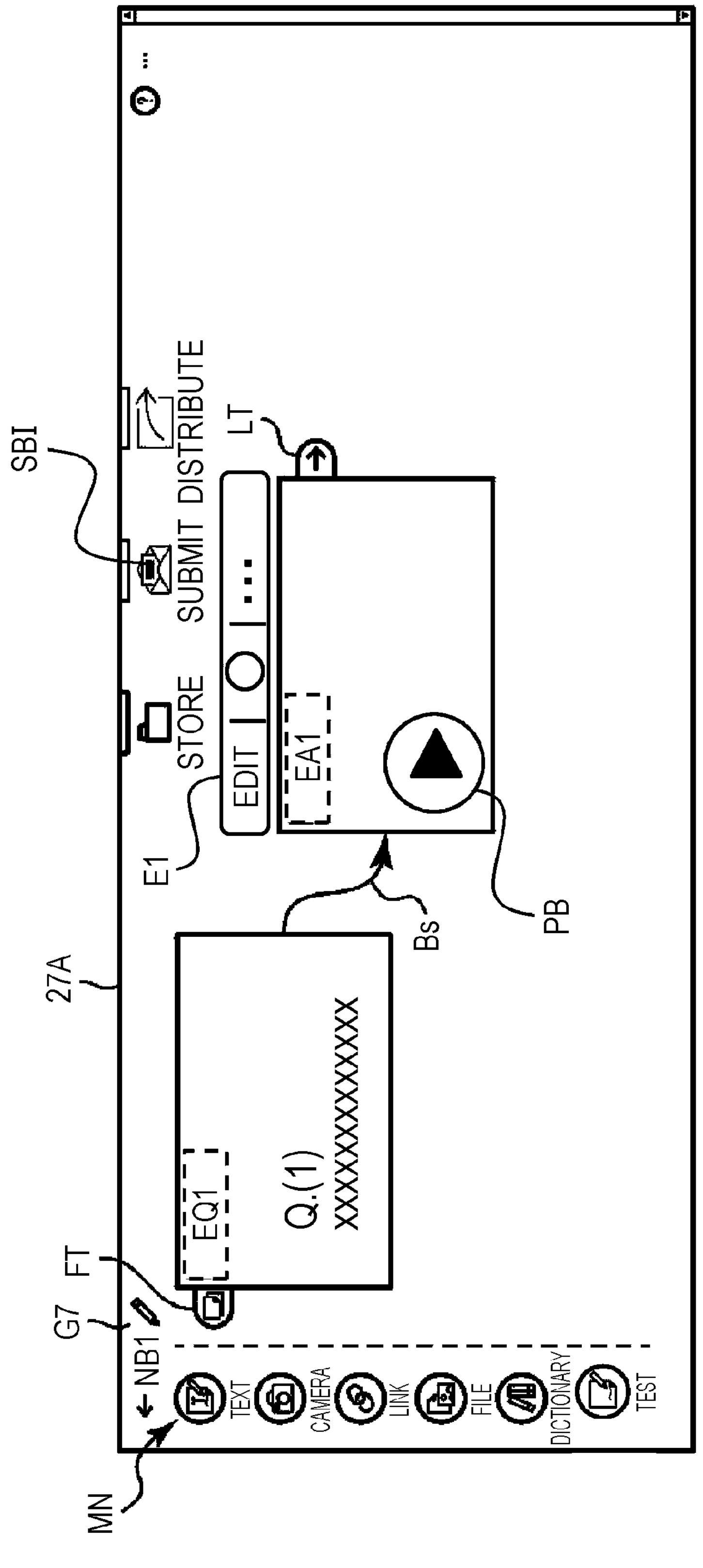
FIG. 21 is a diagram illustrating an example of a screen displayed on the display unit of the user terminal when the answer submission processing illustrated in FIG. 16 is executed.

FIG. 16 is a flowchart illustrating answer submission processing according to the server control program 12*a* of the information processing server 10. FIGS. 17, 18, and 21 are diagrams illustrating examples of screens displayed on the display unit 27A at the time of the answer submission processing.

FIG. 17 illustrates an example of an answer list screen G5 that displays an answer list. For example, when detecting a touch operation on the [answer list] button ALB on the test question screen G3, the control unit 11 displays the answer list screen G5 on the display unit 27A.

On the answer list screen G5 exemplified in FIG. 17, content including a status of the student (answered/unanswered), a self-determination result, and a [to determination] button (JB1, JB2, . . . ) is displayed for each question.

In a state where the answer list screen G5 is displayed on the display unit 27A, the control unit 11 stands by for a touch operation on the [to determination] button (JB1, JB2, . . . ) (step S501).

When detecting a touch operation on the [to determination] button (for example, the [to determination] button JB1 corresponding to the question Q(1)) (step S501: YES), the control unit 11 displays an example answer screen G6 exemplified in FIG. 18 on the display unit 27A (step S502).

On the example answer screen G6 illustrated in FIG. 18, a [play back] button PB, three self-determination buttons (Good/Average/Poor) SJB, and a [sticky note] button SNB are displayed together with an example of an answer to the question Q(1).

The control unit 11 stands by for a touch operation on each button. For example, when detecting a touch operation on the [play back] button PB, the control unit 11 instructs the student terminal 20 to play back the recording data stored in the storage unit 22 in step S405 of FIG. 13. Thus, the recording data (for example, a voice answer by the student) is played back in the student terminal 20.

When detecting a touch operation on the self-determination button SJB, the control unit 11 stores a self-determination result (Good/Average/Poor) corresponding to the touched self-determination button SJB in the user management data storage area 12*c*, for example, in association with the status of the student for the question.

Note that the answer list screen G5 in FIG. 17 illustrates a state where the student gives "Good" as the self-determination result for the question Q(1).

When detecting a touch operation on the [sticky note] button SNB (step S503: YES), the control unit 11 executes sticky note processing (step S504).

Figure 19:
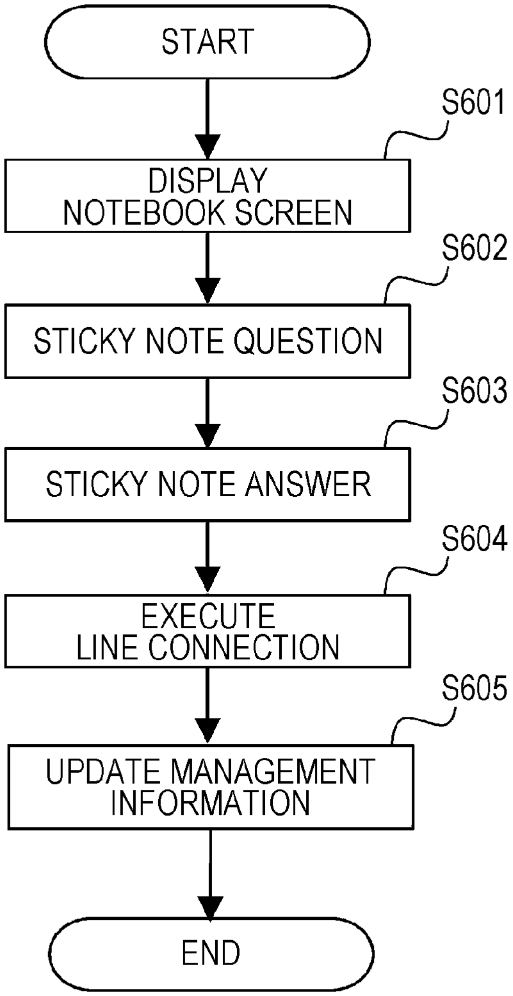
FIG. 19 is a diagram illustrating a subroutine of sticky note processing (step S504) in FIG. 16.

FIG. 19 illustrates a subroutine of the sticky note processing (step S504) according to the server control program 12*a* of the information processing server 10. The sticky note processing is batch processing executed in response to a user operation on the [sticky note] button SNB. Here, execution of the sticky note processing for the question Q(1) will be described as an example.

In the sticky note processing of FIG. 19, the control unit 11 reads notebook data of the notebook NBm (for example, the notebook NB1) from the user management data storage area 12*c*, and displays the notebook data on the display unit 27 as a notebook screen G7 of the notebook NB1 on the basis of the sticky note management table 12*d* (step S601). The notebook NBm read from the user management data storage area 12*c* may be, for example, a notebook specified in advance by the user, or may be a newly created notebook.

The control unit 11 sticky notes the question Q(1) (step S602).

Specifically, the control unit 11 displays the new electronic sticky note (for convenience, described as a "test question sticky note") in the notebook NB1, and causes the student terminal 20 to acquire an image of the question Q(1). As an example, the student terminal 20 acquires the image of the question Q(1) remaining as a history in the work data storage area 22*d* in response to an instruction of the control unit 11. The control unit 11 inputs the image acquired by the student terminal 20 as a thumbnail to the test question sticky note.

In step S602, the control unit 11 further acquires a link (for example, uniform resource locator (URL)) of the question Q(1) included in the test question data stored in the test question database storage area 12*b*-2 and executed by the test app of the information processing server 10, and embeds the link in the test question sticky note. As an example, a link sticky note specifying the link is described so that, when the test question sticky note is clicked, the question Q(1) stored in a link destination is displayed on the display unit 27 of the user terminal 20 on which the click operation is performed.

As described above, the test question sticky note (an example of the first object) is a display object that can be displayed on the screen, and includes information (URL) regarding a storage destination in which the test question (an example of the first information) is stored.

The control unit 11 sticky notes the answer (here, the voice answer) to the question Q(1) (step S603).

Specifically, the control unit 11 instructs the student terminal 20 to upload the recording data stored in the storage unit 22 in step S405 of FIG. 13, and causes, for example, the user management data storage area 12*c* to store voice data uploaded in response to the instruction. The control unit 11 displays a new electronic sticky note (for convenience, described as "answer sticky note") in the notebook NB1, and attaches a link (for example, a URL) of the voice data stored in the user management data storage area 12*c* to the answer sticky note. The control unit 11 further starts a text input app of the student terminal 20. Thus, in the student terminal 20, an optional text according to a user operation can be input to the answer sticky note to display.

As described above, the answer sticky note (an example of the second object) is a display object that can be displayed on the screen, and includes information (URL) regarding a storage destination in which the recording data (an example of the second information) is stored.

The control unit 11 connects (performs line connection of) the test question sticky note and the answer sticky note by the connection arrow Bs (step S604). Here, for convenience, a set of information including the test question sticky note, the answer sticky note, and the connection information (arrow Bs) is described as an "electronic sticky note set SNS".

The control unit 11 updates the management information in the storage unit 12 (step S605).

Specifically, the control unit 11 updates the notebook data of the notebook NB1 to content including the test question sticky note and the answer sticky note (including the recording data), and registers the information regarding the electronic sticky note set SNS in the sticky note management table 12*d*.

FIG. 20 illustrates an example of content of the electronic sticky note set SNS registered in the sticky note management table 12*d* in the update processing (step S605). In FIG. 20, symbols ET1 to ET3 denote IDs of the electronic sticky note sets SNS. A symbol EQ1 is an example of an electronic sticky note ID of the test question sticky note. Symbols EA1 and EA2 are examples of electronic sticky note IDs of the answer sticky notes. For convenience, the test question sticky note to which the electronic sticky note ID of the symbol EQ1 is attached is described as a "test question sticky note EQ". The answer sticky notes to which the electronic sticky note IDs of the symbols EA1 and EA2 are attached are described as "answer sticky note EA1" and "answer sticky note EA2", respectively.

In the sticky note management table 12*d*, information (an electronic sticky note ID, a type, an attribute, coordinates, a size, a connection open/close flag, and a connection sticky note ID) of the test question sticky note and the answer sticky note included in the electronic sticky note set SNS is registered in association with an ID of the electronic sticky note set SNS created in the sticky note processing for each user ID (for example, an ID of the student) registered in the user management data storage area 12*c*. Note that, for example, information such as "test question/uneditable" is registered in data setting information of the test question sticky note. For example, information such as "answer/editable" is registered in data setting information of the answer sticky note.

In the example of FIG. 20, the answer sticky note EA1 including an answer of the student is connected (subjected to line connection) to the test question sticky note EQ1. Therefore, the electronic sticky note ID of the test question sticky note EQ1 is registered as a connection source of the answer sticky note EA1, and the electronic sticky note ID of the answer sticky note EA1 is registered as a connection destination of the test question sticky note EQ1.

Note that, as described later, the teacher who corrects the answer of the student can input a text such as advice to the answer sticky note EA1. Furthermore, the teacher can create an electronic sticky note different from the answer sticky note EA1 (the answer sticky note EA2 in the example of FIG. 20), input advice or the like to the created electronic sticky note, and connect (perform line connection of) the electronic sticky note to the answer sticky note EA1. In the present embodiment, such an answer sticky note can be included in the electronic sticky note set SNS. In this case, the electronic sticky note ID of the answer sticky note EA1 is registered as a connection source of the answer sticky note EA2, and the electronic sticky note ID of the answer sticky note EA2 is registered as a connection destination of the answer sticky note EA1.

Furthermore, in another embodiment, in the sticky note processing, the answer sticky note EA1 may be connected (subjected to line connection) to the test question sticky note EQ1, and further, the answer sticky note EA2 may be connected as a preliminary answer sticky note. For example, content of the preliminary answer sticky note EA2 is blank. The student and the teacher can optionally input a comment or the like to the answer sticky note EA2.

By execution of the sticky note processing, the notebook screen G7 exemplified in FIG. 21 is displayed on the display unit 27A. On the notebook screen G7, the test question sticky note EQ1 and the answer sticky note EA1 that are connected (subjected to the line connection) are displayed in an expanded state. Note that, in the following description, it is assumed that there is no connection of the answer sticky note EA2.

As described above, when detecting that the second information (for example, the answer to the test question by the first user) for the first information (for example, the test question) acquired from the database (for example, the test question database storage area 12*b*-2) is input by the user operation and detecting the instruction to generate the object for the second information (for example, the touch operation on the [sticky note] button SNB as an example of an instruction icon for instructing generation of the object), the control unit 11 generates the test question sticky note EQ1 (an example of the first object), the answer sticky note EA1 (an example of the second object), and the information indicating that the test question sticky note EQ1 and the answer sticky note EA1 are in a correspondence relationship (for example, the connection arrow Bs that connects the test question sticky note EQ1 and the answer sticky note EA1). The control unit 11 stores, in the storage unit 12, the electronic sticky note set SNS (an example of the corresponding object information) including the test question sticky note EQ1, the answer sticky note EA1, and the connection arrow Bs.

In addition, the connection arrow Bs is an example of image information indicating that the test question sticky note EQ1 and the answer sticky note EA1 are associated with each other.

The user such as the student or the teacher can grasp that the test question sticky note EQ1 and the answer sticky note EA1 are in a correspondence relationship (that is, which speaking question the voice answer is for) from the electronic sticky note set SNS. The user can easily specify the answer to the test question even when a considerable amount of time has passed since the test question was asked. The user does not need to search for the test question corresponding to the answer one by one.

As described above, according to the present embodiment, convenience when evaluation of information in a correspondence relationship such as a test question and an answer thereof (for example, scoring for the answer) is performed is improved.

The [play back] button PB and an [edit control] button E1 are added to and displayed on the answer sticky note EA1 displayed on the notebook screen G7. By performing a touch operation on the [play back] button PB, the student can play back the recording data (voice data) attached as link information to the answer sticky note EA1 on the student terminal 20.

Furthermore, by performing a touch operation on the [edit control] button E1, the student can input a text (for example, a comment asking the teacher for advice) to the answer sticky note EA1. That is, the control unit 11 inputs the text to the answer sticky note EA1 (updates the second information included in the second object) according to the user operation on the answer sticky note EA1 (an example of the second object) included in the electronic sticky note set SNS (an example of the corresponding object information).

When the sticky note processing (step S504) is completed, the control unit 11 stands by for a touch operation on the [fold] tab FT (step S505).

When the touch operation is performed on the [fold] tab FT (step S505: YES), the control unit 11 displays, in a folded manner on the display unit 27A, the test question sticky note EQ1 and the answer sticky note EA1 in the expanded state (step S506), and updates the connection open/close flag of the sticky note management table 12*d* (step S507).

The control unit 11 stands by for a submission operation (step S508). Here, the "submission operation" indicates an operation of dragging the test question sticky note EQ1 in the folded state in a state where a student touches the test question sticky note EQ1 on the notebook screen G7 and canceling the drag at a display position of a submission icon SBI.

When detecting the submission operation (step S508: YES), the control unit 11 transfers the electronic sticky note set SNS (that is, the test question sticky note EQ1 and the answer sticky note EA1 in the connection (line connection) state) to the teacher terminal 20 (step S509). That is, the control unit 11 transfers the electronic sticky note set SNS (an example of the corresponding object information) from the student terminal 20 (an example of a first device) to the teacher terminal 20 (an example of a second device).

Next, the control unit 11 notifies the teacher terminal 20 of the submission of the question and the answer by the student (step S510). The teacher who receives the notification can know the submission of the question and the answer by the student.

Figure 22:
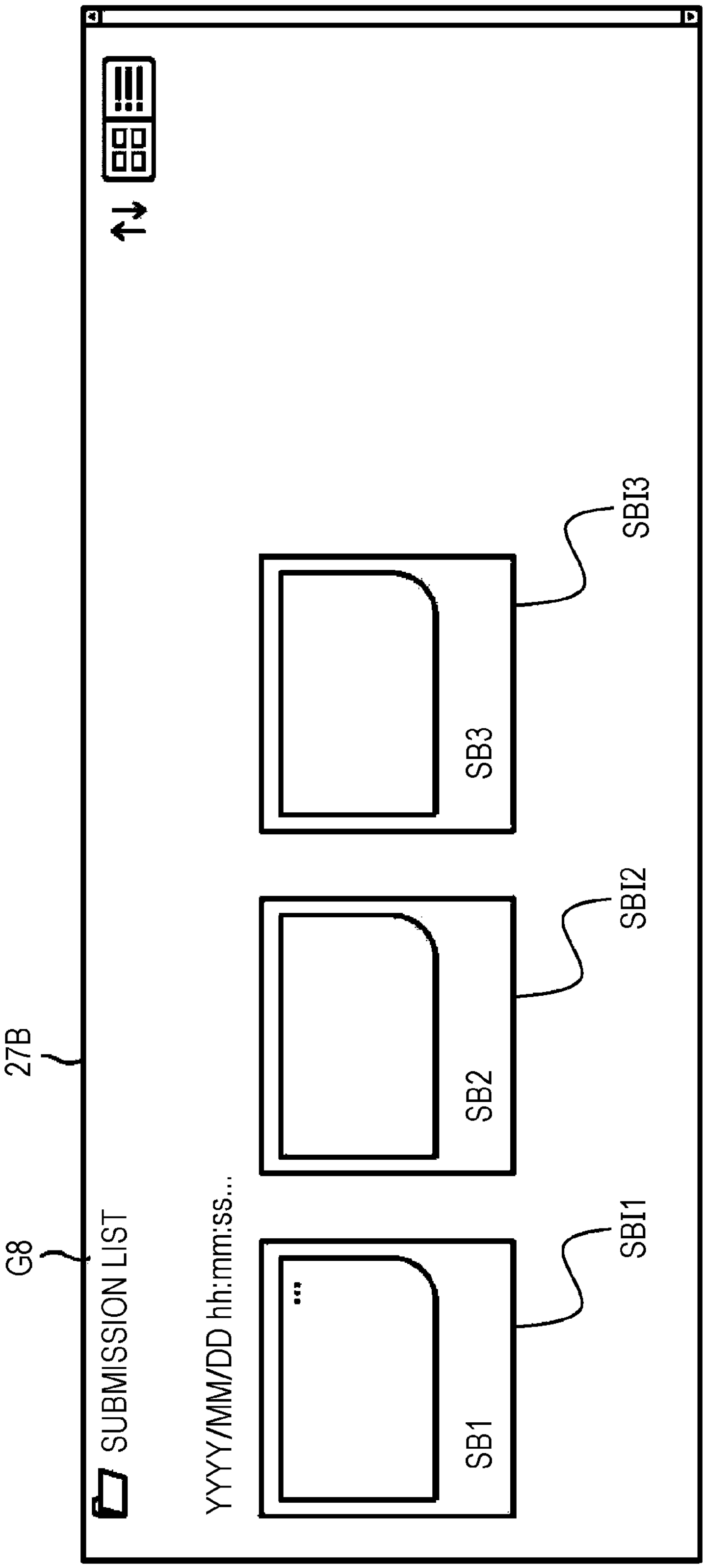
FIG. 22 is a diagram illustrating a submission list screen displayed on the display unit of the user terminal in the one embodiment of the present disclosure.

FIG. 22 illustrates an example of a submission list screen G8 displayed on the display unit 27B of the teacher terminal 20.

The control unit 11 displays the submission list screen G8 on the display unit 27B according to an operation of the teacher on the teacher terminal 20. On the submission list screen G8 exemplified in FIG. 22, submissions (here, submissions SB1 to SB3) submitted by the student are displayed in a list in a form of submission icons (here, submission icons SBI1 to SBI3).

Figure 23:
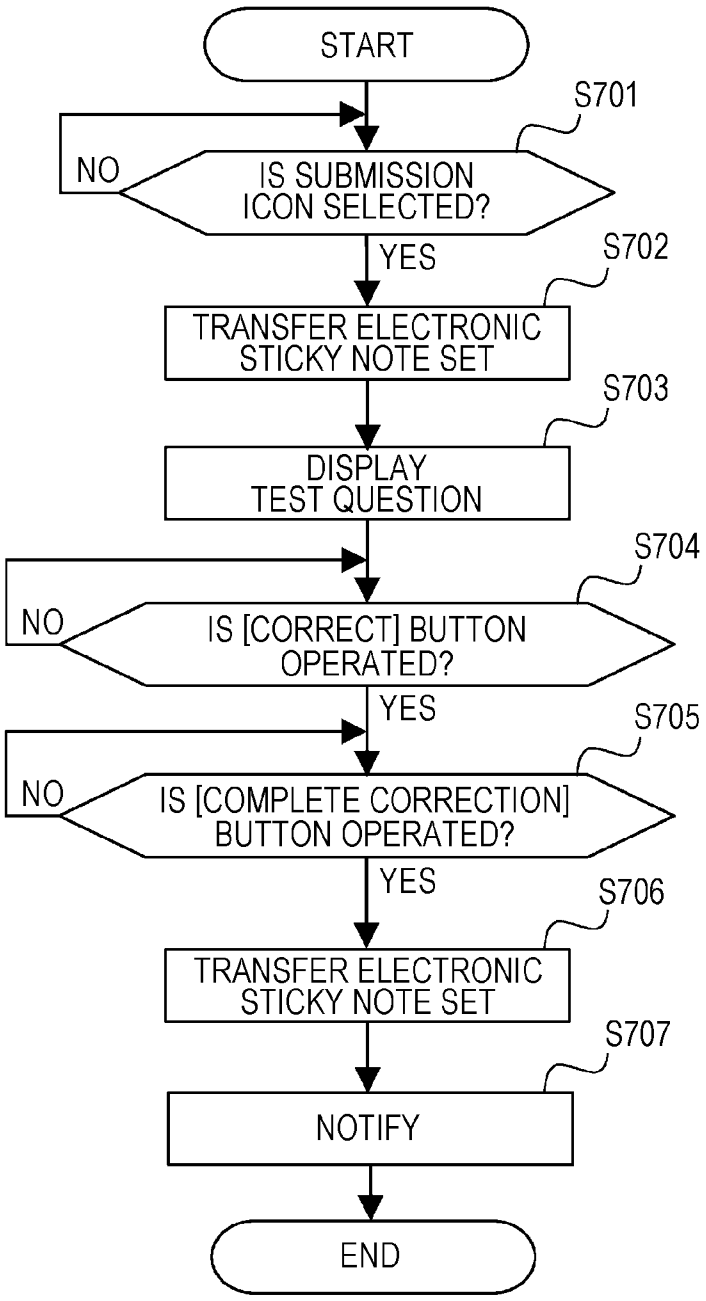
FIG. 23 is a flowchart illustrating scoring processing executed by the information processing server according to the one embodiment of the present disclosure.
Figure 24:
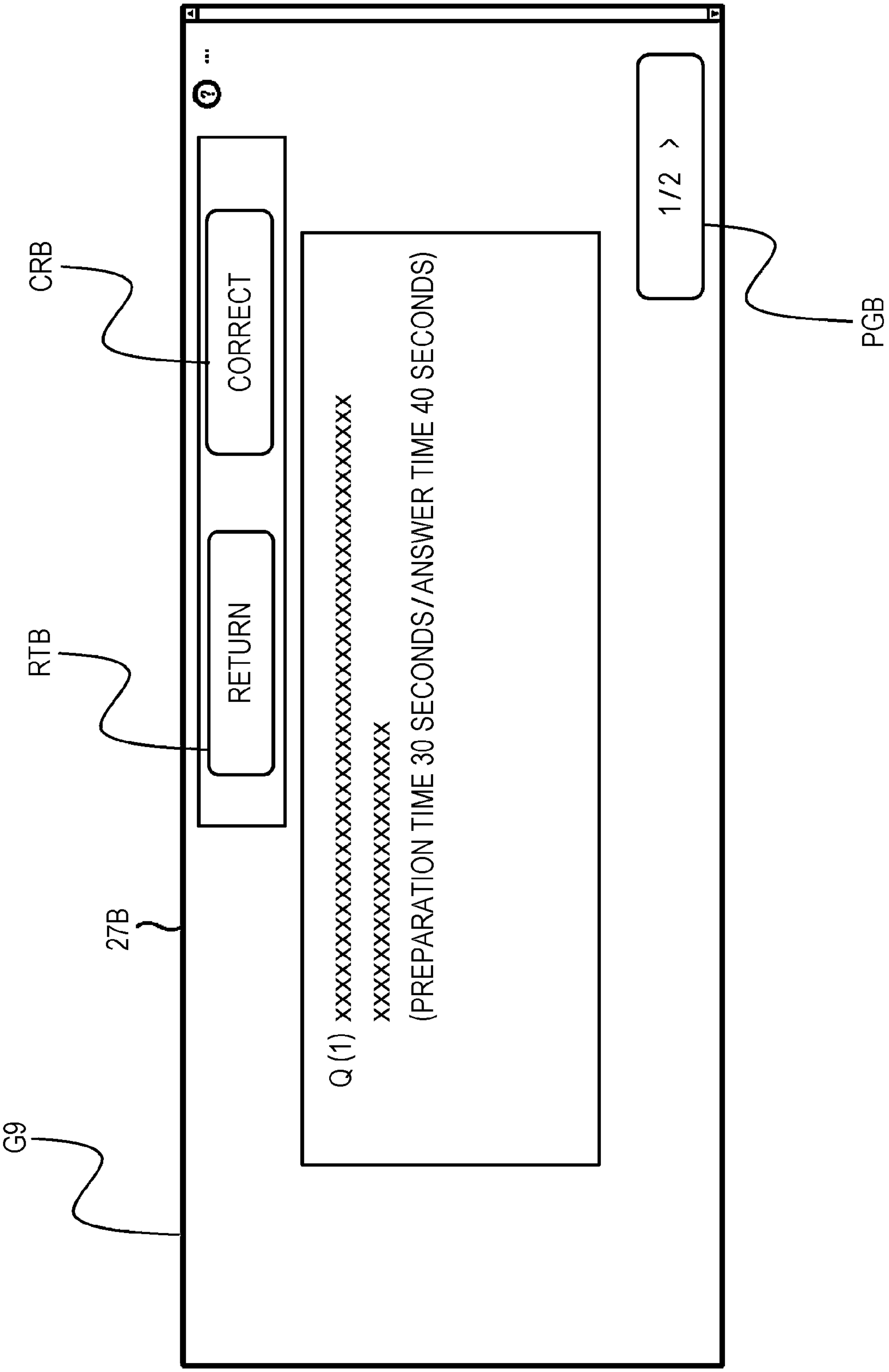
FIG. 24 is a diagram illustrating an example of a screen displayed on the display unit of the user terminal when the scoring processing illustrated in FIG. 23 is executed.
Figure 25:
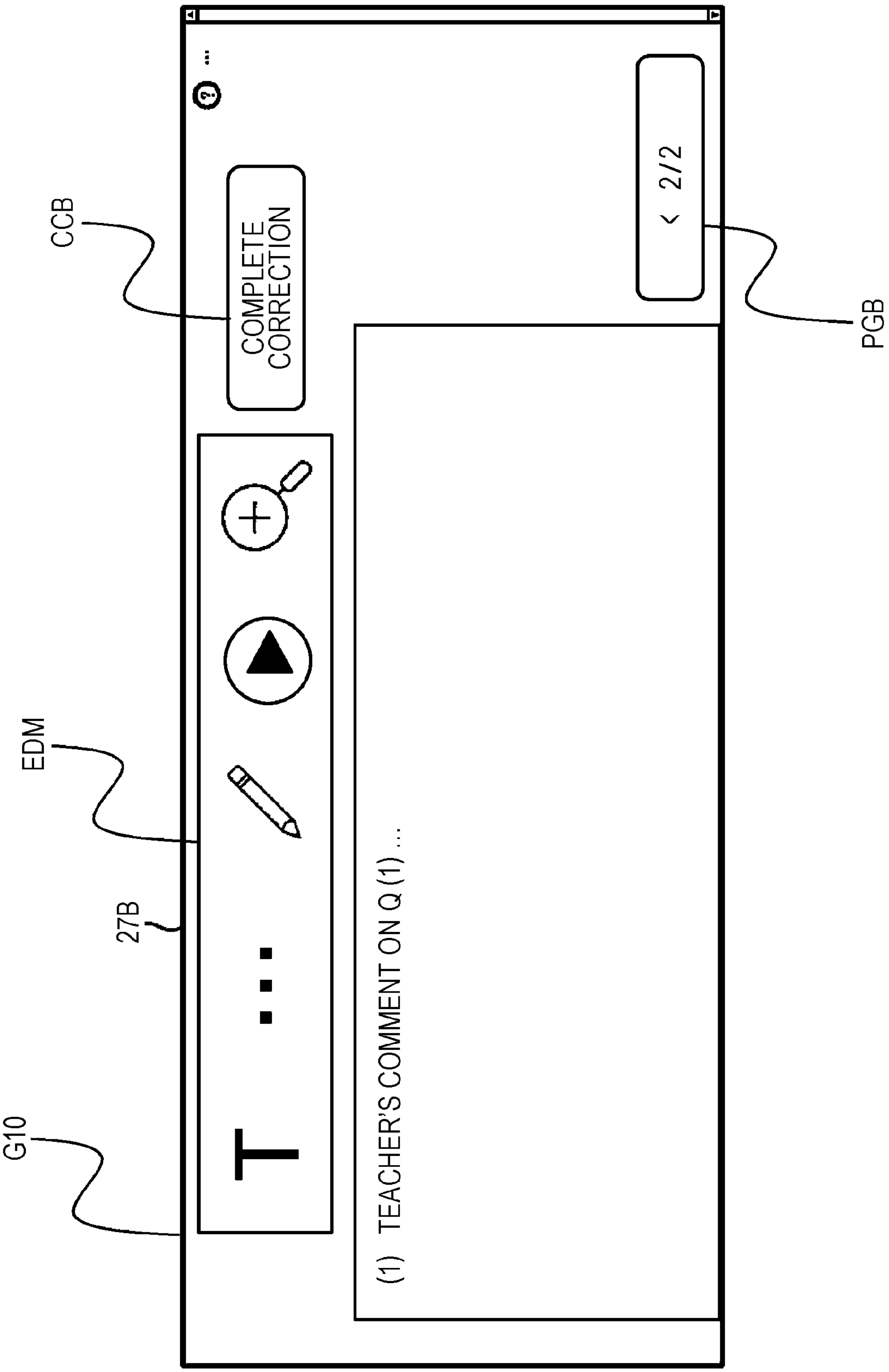
FIG. 25 is a diagram illustrating an example of a screen displayed on the display unit of the user terminal when the scoring processing illustrated in FIG. 23 is executed.

FIG. 23 is a flowchart illustrating scoring processing according to the server control program 12*a* of the information processing server 10. FIGS. 24 and 25 are diagrams illustrating examples of screens displayed on the display unit 27B at the time of the scoring processing.

In a state where the submission list screen G8 is displayed on the display unit 27B, the control unit 11 stands by for a touch operation on the submission icon (any one of the submission icons SBI1 to SBI3) (step S701).

When detecting the touch operation on the submission icon (for example, the submission icon SBI1) (step S701: YES), the control unit 11 transfers the electronic sticky note set SNS corresponding to the submission icon SBI1 to the teacher terminal 20 (step S702). The control unit 11 causes the teacher terminal 20 to download the test question stored in the link destination embedded in the test question sticky note and displays the test question on the display unit 27B (step S703).

FIG. 24 illustrates an example of a submission browsing screen G9 displayed on the display unit 27B.

On the submission browsing screen G9 exemplified in FIG. 24, the first page of the submission (for example, the question Q(1)) is displayed, and a [return] button RTB, a [correct] button CRB, and a [select page] button PGB are displayed.

In a state where the submission browsing screen G9 is displayed on the display unit 27B, the control unit 11 stands by for a touch operation on each button. Note that, at this point, the [return] button RTB is inactive and cannot be selected. The [return] button RTB becomes active and selectable after completion of a correction mode to be described later.

For example, when detecting a touch operation on the [select page] button PGB, the control unit 11 causes the teacher terminal 20 to download the second page of the submission (for example, the comment of the student input to the answer sticky note) and displays the second page on the display unit 27B. As described above, the teacher can confirm the test question and the comment of the student on the submission browsing screen G9.

When detecting a touch operation on the [correct] button CRB, the control unit 11 performs transition to the correction mode (step S704). FIG. 25 illustrates an example of a correction screen G10 displayed on the display unit 27B in the correction mode.

In the correction mode, a [correction operation] menu EDM and a [complete correction] button CCB are displayed together with the submission of the student. The [correction operation] menu EDM includes, for example, a text input icon and a voice playback icon.

For example, when detecting a touch operation on the voice playback icon in the [correction operation] menu EDM (step S704: YES), the control unit 11 instructs the teacher terminal 20 to download and play back the recording data attached to the answer sticky note. In response to the instruction from the control unit 11, the teacher terminal 20 accesses the link (for example, the URL indicating a storage location of the recording data in the user management data storage area 12*c*) to download the recording data, and plays back the downloaded recording data (for example, the voice answer by the student).

As described above, the teacher can operate the voice playback icon in the [correction operation] menu EDM to play back the recording data (for example, the voice answer by the student) attached to the second page of the submission (answer sticky note). Furthermore, the teacher can operate the text input icon in the [correction operation] menu EDM to write a comment (for example, evaluation/scoring of the voice answer of the student) on the second page of the submission. In response to the write operation, the control unit 11 updates the content of the answer sticky note included in the corresponding notebook data.

As described above, the electronic sticky note set SNS includes the test question and the answer thereof as a set. Therefore, the teacher who has received the electronic sticky note set SNS can easily grasp which test question the answer by the student is for. The teacher does not need to search for the test question corresponding to the answer one by one. Therefore, convenience when scoring is performed is high.

In a state where the correction screen G10 is displayed on the display unit 27B, the control unit 11 stands by for a touch operation on the [complete correction] button CCB (step S705).

When detecting the touch operation on the [complete correction] button CCB (step S705: YES), the control unit 11 transfers the current electronic sticky note set SNS (for example, one in which the evaluation/scoring of the voice answer is written) to the student terminal 20 (step S706), and notifies the student terminal 20 of a reply of a correction result by the teacher (step S707). The student who has received the notification can know that the correction result has been returned from the teacher.

As described above, in the scoring processing illustrated in FIG. 23, in case of receiving the electronic sticky note set SNS (an example of the corresponding object information) by the teacher terminal 20 (an example of the second device), the control unit 11 causes the teacher terminal 20 to output the test question and the answer thereof on the basis of the electronic sticky note set SNS (for example, causes the teacher terminal 20 as an example of an output device to display the test question or play back the voice answer), updates (for example, writes the evaluation/scoring in) the answer sticky note (an example of the second object) according to the user operation on the answer (an example of the second information), and transfers the electronic sticky note set SNS including the answer sticky note in which the evaluation/scoring is written from the teacher terminal 20 (an example of the second device) to the student terminal 20 (an example of the first device).

For example, the student who has received the notification can operate the student terminal 20 to display the notebook screen G7 on the display unit 27A, and confirm the electronic sticky note set SNS transferred from the teacher terminal 20 on the notebook screen G7. The student can obtain the evaluation/scoring by the teacher written in the answer sticky note as feedback of learning.

For example, the student who has confirmed the evaluation/scoring by the teacher can operate the student terminal 20 to display the answer list screen G5 on the display unit 27A. For example, the student can operate the self-determination button SJB to give a self-determination (Good/Average/Poor) reflecting the result of the evaluation/scoring by the teacher.

The above-described embodiments have been given as specific examples to facilitate understanding of the disclosure, and the present invention is not limited to the above-described embodiments, and needs to be understood as including various modifications and alternative forms of the above-described embodiments. For example, it will be understood that the above-described embodiments can be embodied by modifying the components without departing from the spirit and scope thereof. Furthermore, it will be understood that various embodiments can be implemented by appropriately combining a plurality of components disclosed in the above-described embodiments. Moreover, a person skilled in the art will understand that various embodiments can be implemented by deleting some components from all the components indicated in the embodiments or adding some components to the components indicated in the embodiments. That is, the program, the server device, the client device, the system, the method implemented by the server device, and the method implemented by the client device can be variously modified and changed without departing from the description of the scope of the claims.

For example, the hardware configurations of the information processing server 10 and the user terminal 20 are not particularly limited. As an example, the information processing server 10 is illustrated as a single device in FIG. 1, but may include a plurality of devices. The information processing server 10 and the user terminal 20 may be any computers as long as each includes a processor and a memory. The above-described functional configurations included in the information processing server 10 and the user terminal 20 may be implemented by a processor executing a program on a memory.

The processor is not particularly limited, but may be, for example, a central processing unit (CPU) or a graphics processing unit (GPU). Furthermore, the processor may include a hardware circuit such as a field-programmable gate array (FPGA) or an application specific integrated circuit (ASIC). The memory is not particularly limited, but may be a semiconductor memory such as a random access memory (RAM), a read only memory (ROM), or a solid state drive (SSD), a magnetic storage device such as a hard disk drive (HDD), or an optical storage device.

What is claimed is:

1. An information processing device comprising:

a computer configured to:

detect that second information for first information acquired from a database is input by a user operation;

generate, in response to detecting an instruction to generate an object for the second information, a first object including the first information and not including the second information, a second object including the second information, and information indicating that the first object and the second object are in a correspondence relationship; and control an object display screen to display the first object on top and the second object overlapped below the first object in response to a first user operation on a first display control element associated with the first object.

2. The information processing device according to claim 1, wherein the computer is further configured to:

display, on the object display screen displaying the second information, an instruction icon that instructs generation of the object;

by detecting a user operation on the instruction icon, generate the first object, the second object, and the information indicating that the first object and the second object are in the correspondence relationship;

control the object display screen to display the first object and the second object in association with the information indicating that the first object and the second object are in the correspondence relationship; and in response to a second user operation on a second display control element associated with the first object, control the object display screen to display the second object in an expanded manner.

3. The information processing device according to claim 2, wherein the first object and the second object are display objects displayable on the object display screen, and wherein the information indicating that the first object and the second object are in the correspondence relationship includes image information indicating that the first object and the second object are associated with each other.

4. The information processing device according to claim 1, wherein the first object and the second object include information regarding storage destinations in which the first information and the second information are stored, respectively.

5. The information processing device according to claim 1, wherein the computer is further configured to:

update the second information according to a user operation on the second object.

6. The information processing device according to claim 1, wherein each of the first information and the second information includes at least one element selected from the group consisting of a character, a sound, a still image, and a moving image.

7. The information processing device according to claim 1, wherein the computer is further configured to:

transfer corresponding object information including the first object, the second object, and the information indicating that the first object and the second object are in the correspondence relationship from a first device communicatively connected to the information processing device to a second device communicatively connected to the information processing device.

8. The information processing device according to claim 7, wherein the computer is further configured to:

cause, in case of receiving the corresponding object information by the second device, the second device to output the first information and the second information to an output device according to the received corresponding object information;

update the second object according to a user operation on the second information output to the output device; and transfer the corresponding object information in which the second object is updated from the second device to the first device.

9. The information processing device according to claim 1, wherein the first object and the second object are electronic sticky notes.

10. The information processing device according to claim 1, wherein the first information indicates a test question, and the second information indicates an answer input by a user to the test question.

11. An information processing method executed by an information processing device, the information processing method comprising:

detecting that second information for first information acquired from a database is input by a user operation;

generating, in response to detecting an instruction to generate an object for the second information, a first object including the first information and not including the second information, a second object including the second information, and information indicating that the first object and the second object are in a correspondence relationship; and controlling an object display screen to display the first object on top and the second object overlapped below the first object in response to a first user operation on a first display control element associated with the first object.

12. The information processing method according to claim 11, further comprising:

displaying, on the object display screen displaying the second information, an instruction icon that instructs generation of the object;

generating the first object, the second object, and the information indicating that the first object and the second object are in the correspondence relationship by detecting a user operation on the instruction icon;

displaying, on the object display screen, the first object and the second object in association with the information indicating that the first object and the second object are in the correspondence relationship; and in the object display screen, in response to a second user operation on a second display control element associated with the first object, displaying the second object in an expanded manner.

13. The information processing method according to claim 11, further comprising:

updating the second information according to a user operation on the second object.

14. The information processing method according to claim 11, further comprising:

transferring corresponding object information including the first object, the second object, and the information indicating that the first object and the second object are in the correspondence relationship from a first device communicatively connected to the information processing device to a second device communicatively connected to the information processing device.

15. The information processing method according to claim 14, further comprising:

causing, in case of receiving the corresponding object information by the second device, the second device to output the first information and the second information to an output device according to the received corresponding object information;

updating the second object according to a user operation on the second information output to the output device; and transferring the corresponding object information in which the second object is updated from the second device to the first device.

16. A non-transitory computer-readable recording medium recording a program for causing a computer to execute steps of:

detecting that second information for first information acquired from a database is input by a user operation;

generating, in response to detecting an instruction to generate an object for the second information, a first object including the first information and not including the second information, a second object including the second information, and information indicating that the first object and the second object are in a correspondence relationship; and controlling an object display screen to display the first object on top and the second object overlapped below the first object in response to a first user operation on a first display control element associated with the first object.

17. The non-transitory computer-readable recording medium according to claim 16, wherein the program further causes the computer to execute the steps of:

displaying, on the object display screen displaying the second information, an instruction icon that instructs generation of the object;

generating the first object, the second object, and the information indicating that the first object and the second object are in the correspondence relationship by detecting a user operation on the instruction icon;

displaying, on the object display screen, the first object and the second object in association with the information indicating that the first object and the second object are in the correspondence relationship; and in the object display screen, in response to a second user operation on a second display control element associated with the first object, displaying the second object in an expanded manner.

18. The non-transitory computer-readable recording medium according to claim 16, wherein the program further causes the computer to execute the step of:

updating the second information according to a user operation on the second object.

19. The non-transitory computer-readable recording medium according to claim 16, wherein the program further causes the computer to execute the step of:

transferring corresponding object information including the first object, the second object, and the information indicating that the first object and the second object are in the correspondence relationship from a first device communicatively connected to the information processing device to a second device communicatively connected to the information processing device.

20. The non-transitory computer-readable recording medium according to claim 19, wherein the program further causes the computer to execute the steps of:

causing, in case of receiving the corresponding object information by the second device, the second device to output the first information and the second information to an output device according to the received corresponding object information;

updating the second object according to a user operation on the second information output to the output device; and transferring the corresponding object information in which the second object is updated from the second device to the first device.

* * * * *